US007885451B1

(12) United States Patent
Walls et al.

(10) Patent No.: US 7,885,451 B1
(45) Date of Patent: Feb. 8, 2011

(54) SYSTEMS AND METHODS FOR DISPLAYING NEGOTIABLE INSTRUMENTS DERIVED FROM VARIOUS SOURCES

(75) Inventors: Carol Ann Walls, San Antonio, TX (US); Gabriel Glenn Gavia, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 845 days.

(21) Appl. No.: 11/591,320

(22) Filed: Oct. 31, 2006

(51) Int. Cl.
*G06K 9/00* (2006.01)
*G06F 17/00* (2006.01)
(52) U.S. Cl. .................. 382/137; 382/294; 235/379
(58) Field of Classification Search .......... 382/101, 382/102, 112, 113, 114, 115, 116, 135–14, 382/157, 168, 180, 181–193, 232, 254, 274, 382/276, 287, 292, 305, 312, 321; 705/45, 705/75, 70; 235/379
See application file for complete search history.

(56) References Cited

U.S. PATENT DOCUMENTS

| | | | |
|---|---|---|---|
| 3,341,820 A | 9/1967 | Grillmeier, Jr. |
| 3,576,972 A | 5/1971 | Wood |
| 3,593,913 A | 7/1971 | Bremer |
| 3,620,553 A | 11/1971 | Donovan |
| 3,648,242 A | 3/1972 | Grosbard |
| 3,816,943 A | 6/1974 | Henry |
| 4,002,356 A | 1/1977 | Weidmann |
| 4,060,711 A | 11/1977 | Buros |
| 4,128,202 A | 12/1978 | Buros |
| 4,136,471 A | 1/1979 | Austin |
| 4,205,780 A | 6/1980 | Burns |
| 4,264,808 A | 4/1981 | Owens et al. |
| 4,305,216 A | 12/1981 | Skelton |
| 4,321,672 A | 3/1982 | Braun |

(Continued)

FOREIGN PATENT DOCUMENTS

EP 0984410 3/2000

(Continued)

OTHER PUBLICATIONS

Leaning, Jeffrey Scott (Reg. No. 51,184); "Remarks and Conclusion" in Response to Office Action mailed Nov. 27, 2007; Response submitted to the USPTO on Feb. 20, 2008; U.S. Appl. No. 09/506,434, filed Feb. 18, 2000; 6 pages.

(Continued)

*Primary Examiner*—Seyed Azarian
(74) *Attorney, Agent, or Firm*—Chadbourne & Parke LLP; Walter G. Hanchuk

(57) ABSTRACT

Various systems, methods and computer-readable media with computer-executable instructions are disclosed that display negotiable instruments derived from various sources. For example, a bank member can draft a check and have that check displayed at his banking institution. Additionally, this bank member can also display any other checks that the member has received. In fact, any check that is either credited or debited from the member's account can appear as a digital image for inspection by the member. Furthermore, any images of checks residing at other banking institutions can be synchronized with the member's institution to amount to a one-stop warehouse for digital images of negotiable instruments for inspection by the member, no matter from where these negotiable instruments may originate.

19 Claims, 18 Drawing Sheets

U.S. PATENT DOCUMENTS

| | | | |
|---|---|---|---|
| 4,523,330 A | 6/1985 | Cain | |
| 4,636,099 A | 1/1987 | Goldstone | |
| 4,640,413 A | 2/1987 | Kaplan | |
| 4,644,144 A | 2/1987 | Chandek | |
| 4,722,444 A | 2/1988 | Murphy | |
| 4,727,435 A | 2/1988 | Otani et al. | |
| 4,774,663 A | 9/1988 | Musmanno | |
| 4,790,475 A | 12/1988 | Griffin | |
| 4,806,780 A | 2/1989 | Yamamoto | |
| 4,837,693 A | 6/1989 | Schotz | |
| 4,890,228 A | 12/1989 | Longfield | |
| 4,927,071 A | 5/1990 | Wood | |
| 4,934,587 A | 6/1990 | McNabb | |
| 4,960,981 A | 10/1990 | Benton et al. | |
| 4,975,735 A | 12/1990 | Bright | |
| 5,022,683 A | 6/1991 | Barbour | |
| 5,053,607 A | 10/1991 | Carlson et al. | |
| 5,157,620 A | 10/1992 | Shaar | |
| 5,159,548 A | 10/1992 | Caslavka | |
| 5,191,525 A | 3/1993 | LeBrun | |
| 5,220,501 A | 6/1993 | Lawlor et al. | |
| 5,237,159 A | 8/1993 | Stephens | |
| 5,265,008 A | 11/1993 | Benton et al. | |
| 5,321,816 A | 6/1994 | Rogan | |
| 5,350,906 A | 9/1994 | Brody | |
| 5,373,550 A | 12/1994 | Campbell et al. | |
| 5,419,588 A | 5/1995 | Wood | |
| 5,422,467 A | 6/1995 | Graef | |
| 5,504,538 A | 4/1996 | Tsujihara | |
| 5,583,759 A | 12/1996 | Geer | |
| 5,590,196 A | 12/1996 | Moreau | |
| 5,594,225 A | 1/1997 | Botvin | |
| 5,598,969 A | 2/1997 | Ong | |
| 5,602,936 A | 2/1997 | Green | |
| 5,610,726 A | 3/1997 | Nonoshita | |
| 5,611,028 A | 3/1997 | Shibasaki | |
| 5,630,073 A | 5/1997 | Nolan | |
| 5,668,897 A | 9/1997 | Stolfo | |
| 5,673,320 A | 9/1997 | Ray | |
| 5,677,955 A | 10/1997 | Doggett et al. | |
| 5,679,938 A | 10/1997 | Templeton et al. | |
| 5,680,611 A | 10/1997 | Rail | |
| 5,691,524 A | 11/1997 | Josephson | |
| 5,737,440 A | 4/1998 | Kunkler | |
| 5,751,842 A | 5/1998 | Riach et al. | |
| 5,830,609 A | 11/1998 | Warner et al. | |
| 5,832,463 A | 11/1998 | Funk | |
| 5,863,075 A | 1/1999 | Rich | |
| 5,870,456 A | 2/1999 | Rogers | |
| 5,870,724 A | 2/1999 | Lawlor et al. | |
| 5,878,337 A | 3/1999 | Joao | |
| 5,897,625 A | 4/1999 | Gustin et al. | |
| 5,903,878 A | 5/1999 | Talati | |
| 5,903,881 A | 5/1999 | Schrader | |
| 5,910,988 A * | 6/1999 | Ballard | 705/75 |
| 5,917,931 A | 6/1999 | Kunkler | |
| 5,924,737 A | 7/1999 | Schrupp | |
| 5,926,548 A | 7/1999 | Okamoto | |
| 5,930,778 A | 7/1999 | Geer | |
| 5,937,396 A | 8/1999 | Konya | |
| 5,940,844 A | 8/1999 | Cahill | |
| 5,982,918 A | 11/1999 | Mennie | |
| 5,987,439 A | 11/1999 | Gustin | |
| 6,012,048 A | 1/2000 | Gustin | |
| 6,021,202 A | 2/2000 | Anderson | |
| 6,029,887 A | 2/2000 | Furuhashi | |
| 6,030,000 A | 2/2000 | Diamond | |
| 6,032,137 A * | 2/2000 | Ballard | 705/75 |
| 6,038,553 A | 3/2000 | Hyde | |
| 6,073,119 A | 6/2000 | Bornemisza-wahr | |
| 6,085,168 A | 7/2000 | Mori | |
| 6,097,834 A | 8/2000 | Krouse | |
| 6,097,885 A | 8/2000 | Rayner | |
| 6,105,865 A | 8/2000 | Hardesty | |
| 6,145,738 A | 11/2000 | Stinson | |
| 6,151,426 A | 11/2000 | Lee | |
| 6,159,585 A | 12/2000 | Rittenhouse | |
| 6,170,744 B1 | 1/2001 | Lee | |
| 6,188,506 B1 | 2/2001 | Kaiserman | |
| 6,189,785 B1 | 2/2001 | Lowery | |
| 6,199,055 B1 | 3/2001 | Kara | |
| 6,243,689 B1 | 6/2001 | Norton | |
| 6,278,983 B1 | 8/2001 | Ball | |
| 6,282,826 B1 | 9/2001 | Richards | |
| 6,304,860 B1 | 10/2001 | Martin, Jr. | |
| 6,314,452 B1 | 11/2001 | Dekel | |
| 6,317,727 B1 | 11/2001 | May | |
| 6,339,658 B1 | 1/2002 | Moccagatta | |
| 6,363,164 B1 | 3/2002 | Jones et al. | |
| 6,390,362 B1 | 5/2002 | Martin | |
| 6,397,196 B1 | 5/2002 | Kravetz | |
| 6,413,305 B1 | 7/2002 | Mehta | |
| 6,417,869 B1 | 7/2002 | Do | |
| 6,425,017 B1 | 7/2002 | Dievendorff | |
| 6,429,952 B1 | 8/2002 | Olbricht | |
| 6,449,397 B1 | 9/2002 | Che-Chu | |
| 6,450,403 B1 * | 9/2002 | Martens et al. | 235/379 |
| 6,464,134 B1 | 10/2002 | Page | |
| 6,470,325 B1 | 10/2002 | Leemhuis | |
| 6,505,178 B1 | 1/2003 | Flenley | |
| 6,574,609 B1 | 6/2003 | Downs | |
| 6,578,760 B1 | 6/2003 | Otto | |
| 6,587,837 B1 | 7/2003 | Spagna | |
| 6,609,200 B2 | 8/2003 | Anderson | |
| 6,643,416 B1 | 11/2003 | Daniels | |
| 6,661,910 B2 | 12/2003 | Jones et al. | |
| 6,672,452 B1 | 1/2004 | Alves | |
| 6,682,452 B1 | 1/2004 | Quintus | |
| 6,695,204 B1 | 2/2004 | Stinson | |
| 6,726,097 B2 | 4/2004 | Graef | |
| 6,728,397 B2 | 4/2004 | Mcneal | |
| 6,742,128 B1 | 5/2004 | Joiner | |
| 6,755,340 B1 | 6/2004 | Voss | |
| 6,781,962 B1 | 8/2004 | Williams | |
| 6,786,398 B1 | 9/2004 | Stinson | |
| 6,789,054 B1 | 9/2004 | Makhlouf | |
| 6,829,704 B2 | 12/2004 | Zhang | |
| 6,844,885 B2 | 1/2005 | Anderson et al. | |
| 6,856,965 B1 | 2/2005 | Stinson | |
| 6,883,140 B1 | 4/2005 | Acker et al. | |
| 6,902,105 B2 | 6/2005 | Koakutsu | |
| 6,913,188 B2 | 7/2005 | Wong | |
| 6,931,591 B1 | 8/2005 | Brown | |
| 6,934,719 B2 | 8/2005 | Nally | |
| 6,957,770 B1 | 10/2005 | Robinson | |
| 6,961,689 B1 | 11/2005 | Greenberg | |
| 6,970,843 B1 | 11/2005 | Forte | |
| 6,993,507 B2 | 1/2006 | Meyer | |
| 6,996,263 B2 | 2/2006 | Jones et al. | |
| 6,999,943 B1 | 2/2006 | Johnson et al. | |
| 7,004,382 B2 | 2/2006 | Sandru | |
| 7,010,507 B1 | 3/2006 | Anderson et al. | |
| 7,016,704 B2 | 3/2006 | Pallakoff | |
| 7,039,048 B1 | 5/2006 | Monta | |
| 7,062,768 B2 | 6/2006 | Kubo | |
| 7,113,925 B2 | 9/2006 | Waserstein | |
| 7,114,649 B2 | 10/2006 | Nelson | |
| 7,139,594 B2 | 11/2006 | Nagatomo | |
| 7,140,539 B1 | 11/2006 | Crews | |
| 7,163,347 B2 | 1/2007 | Lugg | |
| 7,181,430 B1 | 2/2007 | Buchanan et al. | |
| 7,197,173 B2 | 3/2007 | Jones et al. | |
| 7,200,255 B2 | 4/2007 | Jones | |
| 7,216,106 B1 * | 5/2007 | Buchanan et al. | 705/45 |

| | | |
|---|---|---|
| 7,249,076 B1 | 7/2007 | Pendleton |
| 7,290,034 B2 | 10/2007 | Budd |
| 7,299,970 B1 | 11/2007 | Ching |
| 7,299,979 B2 | 11/2007 | Phillips |
| 7,313,543 B1 | 12/2007 | Crane |
| 7,321,874 B2 | 1/2008 | Dilip |
| 7,321,875 B2 | 1/2008 | Dilip |
| 7,325,725 B2 | 2/2008 | Foss, Jr. |
| 7,343,320 B1 | 3/2008 | Treyz |
| 7,349,566 B2 | 3/2008 | Jones et al. |
| 7,377,425 B1 | 5/2008 | Ma |
| 7,379,978 B2 | 5/2008 | Anderson |
| 7,385,631 B2 | 6/2008 | Maeno |
| 7,386,511 B2 | 6/2008 | Buchanan |
| 7,391,897 B2 | 6/2008 | Jones |
| 7,391,934 B2 | 6/2008 | Goodall et al. |
| 7,392,935 B2 | 7/2008 | Byrne et al. |
| 7,421,107 B2 | 9/2008 | Lugg |
| 7,440,924 B2 | 10/2008 | Buchanan |
| 7,447,347 B2 | 11/2008 | Weber |
| 7,460,108 B2 | 12/2008 | Tamura |
| 7,461,779 B2 | 12/2008 | Ramachandran |
| 7,461,780 B2 | 12/2008 | Potts |
| 7,477,923 B2 | 1/2009 | Wallmark |
| 7,480,382 B2 | 1/2009 | Dunbar |
| 7,489,953 B2 | 2/2009 | Griffin |
| 7,490,242 B2 | 2/2009 | Torres |
| 7,497,429 B2 | 3/2009 | Reynders |
| 7,506,261 B2 | 3/2009 | Satou |
| 7,512,564 B1 * | 3/2009 | Geer ............................ 705/45 |
| 7,536,440 B2 | 5/2009 | Budd |
| 7,539,646 B2 | 5/2009 | Gilder |
| 7,542,598 B2 * | 6/2009 | Jones et al. ................. 382/135 |
| 7,548,641 B2 | 6/2009 | Gilson et al. |
| 7,609,873 B2 | 10/2009 | Foth et al. |
| 7,620,231 B2 | 11/2009 | Jones |
| 7,647,275 B2 | 1/2010 | Jones |
| 7,672,940 B2 | 3/2010 | Viola |
| 7,702,588 B2 | 4/2010 | Gilder |
| 2001/0014881 A1 | 8/2001 | Drummond |
| 2001/0018739 A1 | 8/2001 | Anderson |
| 2001/0027994 A1 | 10/2001 | Hayashida |
| 2001/0042171 A1 | 11/2001 | Vermeulen |
| 2001/0043748 A1 | 11/2001 | Wesolkowski |
| 2001/0047330 A1 | 11/2001 | Gephart |
| 2001/0054020 A1 | 12/2001 | Barth |
| 2002/0001393 A1 | 1/2002 | Jones |
| 2002/0016763 A1 | 2/2002 | March |
| 2002/0032656 A1 | 3/2002 | Chen |
| 2002/0052841 A1 | 5/2002 | Guthrie |
| 2002/0052853 A1 | 5/2002 | Munoz |
| 2002/0065786 A1 * | 5/2002 | Martens et al. ............... 705/70 |
| 2002/0072974 A1 | 6/2002 | Pugliese |
| 2002/0075524 A1 | 6/2002 | Blair |
| 2002/0084321 A1 | 7/2002 | Martens |
| 2002/0116329 A1 | 8/2002 | Serbetcioglu |
| 2002/0118891 A1 | 8/2002 | Rudd |
| 2002/0120562 A1 | 8/2002 | Opiela |
| 2002/0138522 A1 | 9/2002 | Muralidhar |
| 2002/0147798 A1 | 10/2002 | Huang |
| 2002/0150279 A1 | 10/2002 | Scott |
| 2002/0152161 A1 | 10/2002 | Aoike |
| 2002/0152164 A1 | 10/2002 | Dutta |
| 2002/0152169 A1 | 10/2002 | Dutta et al. |
| 2002/0171820 A1 | 11/2002 | Okamura |
| 2002/0178112 A1 | 11/2002 | Goeller et al. |
| 2003/0005326 A1 | 1/2003 | Flemming |
| 2003/0023557 A1 | 1/2003 | Moore |
| 2003/0038227 A1 | 2/2003 | Sesek |
| 2003/0055756 A1 | 3/2003 | Allan |
| 2003/0055776 A1 | 3/2003 | Samuelson |
| 2003/0075916 A1 | 4/2003 | Gorski |
| 2003/0081824 A1 | 5/2003 | Mennie |
| 2003/0105688 A1 | 6/2003 | Brown |
| 2003/0139999 A1 | 7/2003 | Rowe |
| 2003/0167225 A1 | 9/2003 | Adams |
| 2003/0191615 A1 | 10/2003 | Bailey |
| 2003/0191869 A1 | 10/2003 | Williams |
| 2003/0200174 A1 | 10/2003 | Star |
| 2004/0010466 A1 | 1/2004 | Anderson |
| 2004/0012496 A1 | 1/2004 | De Souza |
| 2004/0024626 A1 | 2/2004 | Bruijning |
| 2004/0024708 A1 | 2/2004 | Masuda |
| 2004/0057697 A1 | 3/2004 | Renzi |
| 2004/0058705 A1 | 3/2004 | Morgan |
| 2004/0066031 A1 | 4/2004 | Wong |
| 2004/0069841 A1 | 4/2004 | Wong |
| 2004/0078299 A1 | 4/2004 | Down-Logan |
| 2004/0080795 A1 | 4/2004 | Bean |
| 2004/0093303 A1 | 5/2004 | Picciallo |
| 2004/0093305 A1 | 5/2004 | Kight |
| 2004/0103296 A1 | 5/2004 | Harp |
| 2004/0109596 A1 | 6/2004 | Doran |
| 2004/0122754 A1 | 6/2004 | Stevens |
| 2004/0138974 A1 | 7/2004 | Shimamura |
| 2004/0148235 A1 | 7/2004 | Craig |
| 2004/0158549 A1 | 8/2004 | Matena |
| 2004/0165096 A1 | 8/2004 | Maeno |
| 2004/0170259 A1 | 9/2004 | Park |
| 2004/0210515 A1 | 10/2004 | Hughes |
| 2004/0236647 A1 | 11/2004 | Acharya |
| 2004/0236688 A1 | 11/2004 | Bozeman |
| 2004/0245324 A1 | 12/2004 | Chen |
| 2004/0252679 A1 | 12/2004 | Williams |
| 2004/0260636 A1 | 12/2004 | Marceau et al. |
| 2004/0267666 A1 | 12/2004 | Minami |
| 2005/0033645 A1 | 2/2005 | Duphily |
| 2005/0033685 A1 | 2/2005 | Reyes |
| 2005/0033695 A1 | 2/2005 | Minowa |
| 2005/0038754 A1 | 2/2005 | Geist |
| 2005/0044042 A1 | 2/2005 | Mendiola |
| 2005/0044577 A1 | 2/2005 | Jerding |
| 2005/0049950 A1 | 3/2005 | Johnson |
| 2005/0075969 A1 | 4/2005 | Nielson et al. |
| 2005/0078336 A1 | 4/2005 | Ferlitsch |
| 2005/0086140 A1 | 4/2005 | Ireland |
| 2005/0086168 A1 | 4/2005 | Alvarez |
| 2005/0091161 A1 | 4/2005 | Gustin |
| 2005/0096992 A1 | 5/2005 | Geisel |
| 2005/0097046 A1 | 5/2005 | Singfield |
| 2005/0108164 A1 | 5/2005 | Salafia |
| 2005/0108168 A1 | 5/2005 | Halpin |
| 2005/0131820 A1 | 6/2005 | Rodriguez |
| 2005/0149436 A1 | 7/2005 | Elterich |
| 2005/0168566 A1 | 8/2005 | Tada |
| 2005/0171899 A1 | 8/2005 | Dunn |
| 2005/0171907 A1 | 8/2005 | Lewis |
| 2005/0177499 A1 | 8/2005 | Thomas |
| 2005/0177518 A1 | 8/2005 | Brown |
| 2005/0182710 A1 | 8/2005 | Andersson |
| 2005/0188306 A1 | 8/2005 | Mackenzie |
| 2005/0209961 A1 | 9/2005 | Michelsen |
| 2005/0228733 A1 | 10/2005 | Bent |
| 2005/0252955 A1 | 11/2005 | Sugai |
| 2005/0267843 A1 | 12/2005 | Acharya et al. |
| 2005/0269412 A1 | 12/2005 | Chiu |
| 2005/0278250 A1 | 12/2005 | Zair |
| 2005/0281471 A1 | 12/2005 | LeComte |
| 2005/0289030 A1 | 12/2005 | Smith |
| 2006/0004660 A1 | 1/2006 | Pranger |
| 2006/0025697 A1 | 2/2006 | Kurzweil |
| 2006/0039629 A1 | 2/2006 | Li |
| 2006/0047593 A1 | 3/2006 | Naratil |
| 2006/0053056 A1 | 3/2006 | Alspach-Goss |
| 2006/0059085 A1 | 3/2006 | Tucker |
| 2006/0080245 A1 | 4/2006 | Bahl |

| | | |
|---|---|---|
| 2006/0085357 A1 | 4/2006 | Pizarro |
| 2006/0102704 A1 | 5/2006 | Reynders |
| 2006/0106691 A1 | 5/2006 | Sheaffer |
| 2006/0106717 A1 | 5/2006 | Randle et al. |
| 2006/0110063 A1 | 5/2006 | Weiss |
| 2006/0112013 A1 | 5/2006 | Maloney |
| 2006/0115110 A1 | 6/2006 | Rodriguez |
| 2006/0115141 A1 | 6/2006 | Koakutsu |
| 2006/0118613 A1 | 6/2006 | McMann |
| 2006/0144924 A1 | 7/2006 | Stover |
| 2006/0144950 A1 | 7/2006 | Johnson |
| 2006/0161501 A1 | 7/2006 | Waserstein |
| 2006/0206506 A1 | 9/2006 | Fitzpatrick |
| 2006/0214940 A1 | 9/2006 | Kinoshita |
| 2006/0229976 A1 | 10/2006 | Jung |
| 2006/0229986 A1 | 10/2006 | Corder |
| 2006/0238503 A1 | 10/2006 | Smith |
| 2006/0242062 A1 | 10/2006 | Peterson et al. |
| 2006/0242063 A1 | 10/2006 | Peterson et al. |
| 2006/0249567 A1 | 11/2006 | Byrne et al. |
| 2006/0279628 A1 | 12/2006 | Fleming |
| 2006/0282383 A1 | 12/2006 | Doran |
| 2007/0016796 A1 | 1/2007 | Singhal |
| 2007/0019243 A1 | 1/2007 | Sato |
| 2007/0022053 A1 | 1/2007 | Waserstein |
| 2007/0031022 A1 | 2/2007 | Frew |
| 2007/0050292 A1 | 3/2007 | Yarbrough |
| 2007/0058851 A1 | 3/2007 | Quine |
| 2007/0063016 A1 | 3/2007 | Myatt |
| 2007/0075772 A1 | 4/2007 | Kokubo |
| 2007/0077921 A1 | 4/2007 | Hayashi |
| 2007/0080207 A1 | 4/2007 | Williams |
| 2007/0082700 A1 | 4/2007 | Landschaft |
| 2007/0084911 A1 | 4/2007 | Crowell |
| 2007/0086642 A1 | 4/2007 | Foth et al. |
| 2007/0086643 A1 | 4/2007 | Spier |
| 2007/0094088 A1 | 4/2007 | Mastie |
| 2007/0100748 A1 | 5/2007 | Dheer |
| 2007/0129955 A1 | 6/2007 | Dalmia |
| 2007/0136198 A1 | 6/2007 | Foth et al. |
| 2007/0140594 A1 | 6/2007 | Franklin |
| 2007/0143208 A1 | 6/2007 | Varga |
| 2007/0156438 A1 | 7/2007 | Popadic et al. |
| 2007/0168265 A1 | 7/2007 | Rosenberger |
| 2007/0171288 A1 | 7/2007 | Inoue |
| 2007/0194102 A1 | 8/2007 | Cohen et al. |
| 2007/0241179 A1 | 10/2007 | Davis et al. |
| 2007/0255652 A1 | 11/2007 | Tumminaro |
| 2007/0258634 A1 | 11/2007 | Simonoff |
| 2008/0002911 A1 | 1/2008 | Eisen |
| 2008/0021802 A1 | 1/2008 | Pendleton |
| 2008/0040280 A1 | 2/2008 | Davis |
| 2008/0052182 A1 | 2/2008 | Marshall |
| 2008/0059376 A1 | 3/2008 | Davis et al. |
| 2008/0063253 A1 | 3/2008 | Wood |
| 2008/0071721 A1 | 3/2008 | Wang et al. |
| 2008/0080760 A1 | 4/2008 | Ronca et al. |
| 2008/0086421 A1 | 4/2008 | Gilder |
| 2008/0103790 A1 | 5/2008 | Abernethy |
| 2008/0117991 A1 | 5/2008 | Peddireddy |
| 2008/0119178 A1 | 5/2008 | Peddireddy |
| 2008/0133411 A1 | 6/2008 | Jones et al. |
| 2008/0147549 A1 | 6/2008 | Ruthbun |
| 2008/0156438 A1 | 7/2008 | Stumphauzer |
| 2008/0219543 A1 | 9/2008 | Csulits |
| 2008/0247629 A1 | 10/2008 | Gilder |
| 2008/0249931 A1 | 10/2008 | Gilder |
| 2008/0262953 A1 | 10/2008 | Anderson |
| 2009/0108080 A1 | 4/2009 | Meyer |
| 2009/0141962 A1 | 6/2009 | Borgia |
| 2009/0171819 A1 | 7/2009 | Von der Emde et al. |
| 2009/0171825 A1 | 7/2009 | Roman |
| 2009/0173781 A1 | 7/2009 | Ramachandran |
| 2009/0190823 A1 | 7/2009 | Walters |
| 2009/0252437 A1 | 10/2009 | Li |
| 2009/0281904 A1 | 11/2009 | Pharris |
| 2009/0313167 A1 | 12/2009 | Dujari |
| 2010/0007899 A1 | 1/2010 | Lay |

FOREIGN PATENT DOCUMENTS

EP            984410 A1    3/2000

OTHER PUBLICATIONS

Shelby, Hon. Richard C. (Chairman, Committee on Banking, Housing and Urban Affairs); "Check Truncation Act of 2003", Calendar No. 168, 108th Congress, 1st Session Senate Report 108-79. Jun. 25, 2003. 9 pages.

Public Law 108-100—108th Congress; "An Act—Check Clearing For The 21st Century Act", Oct. 28, 2003 [H.R. 1474], 117 Stat. 1177, 12 USC 5001. 18 pages.

Johnson, Jennifer J., Secretary of the Board; Federal Reserve System, 12 CFR Part 229, Regulation CC; Docket No. R-1176, "Availability Of Funds and Collection of Checks", downloaded 2009, pp. 1-89.

Oxley, Michael G., from the committee of conference; "Check Clearing for the 21st Century Act", 108th Congress—1st Session, House of Representatives, Report 108-291. Oct. 1, 2003—ordered to be printed. [To accompany H.R. 1474]. pp. 1-27.

Oxley, Michael G., from the Committee on Financial Services; "Check Clearing for the 21st Century Act", 108th Congress—1st Session, House of Representatives, Report 108-132. Jun. 2, 2003. [To accompany H. R. 1474]. pp. 1-20.

Board of Governors of the Federal Reserve System, "Report to Congress on the Check Clearing for the 21st Century Act of 2003", Apr. 2007, Submitted to the Congress pursuant to section 16 of the Check Clearing for the 21st Century Act of 2003. 59 pages.

Rivlin, Alice M. et al., Chair, Vice Chair—Board of Governors, Committee on the Federal Reserve in the Payments Mechanism—Federal Reserve System, "The Federal Reserve in the Payments Mechanism", Jan. 1998. 41 pages.

Craig, Ben; "Resisting Electronic Payment Systems: Burning Down the House?", Federal Reserve Bank of Cleveland, Jul. 1999, 4 pages.

Furst, Karen et al., "Internet Banking: Developments and Prospects", Office of the Comptroller of the Currency—Economic and Policy Analysis Working Paper 2000-9, Sep. 2000.

Wells Fargo—2005 News Releases, "The New Wells Fargo Electronic Deposit Services Break Through Banking Boundaries In the Age of Check 21", San Francisco—Mar. 28, 2005. Retrieved from the internet <https://www.wellsfargo.com/press/3282005_Check2l?year=2005>.

Constanzo, Chris. "Remote Check Deposit: Wells Captures A New Checking Twist", Bank Technology News Article—May 2005. Retrieved from the internet <https://www.americanbanker.com/btn_article.html?id=20050502YQ50FSYG>., 2 pages.

Credit Union Journal, "AFCU Averaging 80 DepositHome Transactions Per Day", Credit Union Journal—Monday, Aug. 15, 2005. 1 page.

Bank Systems & Technology, Untitled Article, May 1, 2006. Retrieved from the internet <https://www.banktech.com/showArticle.jhtml?articleID=I87003126>. pp. 1-4. Copyright 2004-2005 CMP Media, LLC.

Digital Transactions News, "An ACH-Image Proposal For Checks Roils Banks and Networks", May 26, 2006. 3 pages.

BankServ Press Release, "BankServ Announces New Remote Deposit Product Integrated With QuickBooks", San Francisco, Jul. 6, 2006. Retrieved from RemoteDepositCapture.com. pp. 1-3.

Remote Deposit Capture News Article, "PNC Bank to Offer Ease of Online Deposit Service Integrated with QuickBooks to Small Businesses", Remote Deposit Capture News Articles from Jul. 24, 2006. Retrieved from RemoteDepositCapture.com. pp. 1-2.

Association of German Banks, SEPA 2008: Uniform Payment Instruments for Europe, Berlin, Jul. 2007. Publisher: Bundesverband deutscher Banken e. V.

DCU Member's Monthly—Jan. 2008, "PC Deposit—Deposit Checks from Home!", Retrieved from the internet <https://www.

mycreditunionnewsletter.com/dcu/0108/pagel.html>. pp. 1-2. Copyright 2008 Digital Federal Credit Union.
WindowsForDevices.com, "Software lets camera phone users deposit checks, pay bills", Jan. 29, 2008. Retrieved from the internet <https://www.windowsfordevices.com/news/NS3934956670html>. 3 pages.
CNN.com/technology, "Scan, deposit checks from home", Feb. 7, 2008. Retrieved from the internet <https://www.cnn.com/2008/TECH/biztech/02/07/check.scanning.ap/index.html>. 3 pages.
eCU Technologies, "Upost Remote Deposit Solution", Retrieved from the internet <https://www.eutechnologies.com/products/upost.html>. downloaded 2009, 1 page.
The Green Sheet 2.0 :: Newswire, "CO-OP adds home deposit capabilities to suite of check imaging products", Retrieved from the internet <https://www.greensheet.com/newswire.php?newswire_id=8799. downloaded 2009, pp. 1-2.
CreativePaymentSolutions.com, "Creative Payment Solutions—WebSolution", Retrieved from the internet <http://www.creativepaymentsolutions.com/cps/financial_services/websolution/default.html>. Copyright © 2008, Creative Payment Solutions, Inc.
Wells Fargo Commercial, "Remote Deposit", Retrieved from the internet <https://www.wellsfargo.com/com/treasury_mgmt/receivables/electronic/remote_deposit>. © 1999-2008 Wells Fargo. All rights reserved.
Bruene, Jim; "Digital Federal Credit Union and Four Others Offer Consumer Remote Deposit Capture Through EasCorp", NetBanker—Tracking Online Finance. Apr. 13, 2008 9:23 PM. Retrieved from the internet <http://www.netbanker.com/2008/04/digital_federal_credit_union_a.html> © 1995-2007, Financial Insite, Inc.
Credit Union Journal, "The Ramifications of Remote Deposit Capture Success", Credit Union Journal—Monday, Apr. 14, 2008. Retrieved from the internet <http://www.cujournal.com/printthis.html?id=20080411E0DZT57G>. 1 page.
Bruene, Jim; "CheckFree to Enable In-home Remote Check Deposits for Consumers and Small Businesses", NetBanker.com, Feb. 5, 2008 12:23 PM. Retrieved from the internet <http://www.netbanker.com/2008/02/ checkfree_to_enable_inhome_rem.html>. © 1995-2007, Financial Insite, Inc.
Mitek systems, "ImageNet Mobile Deposit—Provides Convenient Check Deposit And Bill Pay to Mobile Consumers", <http://www.miteksystems.com>. downloaded 2009, 2 pages.
Chiang, Chuck Chiang / The Bulletin, "Remote banking offered", Published: Feb. 1, 2006 4:00AM PST. Retrieved from the internet <http://bendbulletin.com/apps/pbcs.dll/article?AID=/20060201/BIZ0102/602010327&templ... >. 2 pages.
fBankServ, "DepositNow: What's the difference?", Copyright 2006, DepositNow.
http://www.bankserv.com/products/remotedeposit.htm, Copyright 2006, BankServ.
Website: RemoteDepositCapture.com, URL: www.RemoteDepositCapture.com/, 2006, 5 pages.
White, J.M. et ai, "ImageThresholuding for Optical Character Recognition and Other Applications Requiring Character Image Extraction", IBM J. Res. Develop, 1983, vol. 27.
Ritzer, J.R. "Hinky Dinky helped spearhead POS, remote banking movement", Bank System & Equipment, vol. 21, No. 12 pp. 51-54, Dec. 1984.
Dinan, R.F. Dinan et al., "ImagePlus High Performance Transaction System", IBM System Journal; 1990, pp. 431-434; vol. 29, No. 3.
Gupta, Amar et aI., "An Integrated Architecture for Recognition of Totally Unconstrained Handwritten Numerals"; International Journal of Pattern Recognition and Artificial Intelligence; 1993, pp. 757-773; vol. 7, No. 4.
Masonson, L. "Check truncation and ACH trends—automated clearing houses," healthcare financial management association, http://WWN.findarticles.com/p/articles/mLm3276/is_n7_v47/ai_14466034/print, 1993.
Zhang, C.Y., "Robust Estimation and Image Combining," Astronomical Data Analysis Software and Systems IV, ASP Conference Series, 1995.

Kornai Andras et aI., "Recognition of Cursive Writing on Personal Checks," Proceedings of International Workshop on the Frontiers in Handwriting Recognition, Sep. 1996, pp. 1-6.
De Queiroz, Ricardo et aI., "Mixed RasterContent (MRC) Model for Compound Image Compression", pp. 1-12.
Rivlin, Alice M. et aI., Chair, Vice Chair—Board of Governors, Committee on the Federal Reserve in the Payments Mechanisrn—Federal Reserve System, "The Federal Reserve in the Payments Mechanism", Jan. 1998.
J.D. Tygar, Atomicity in Electronic Commerce, Apr./May 1998 (Atomicity).
Anderson, Milton M. "FSML and Echeck", Financial Services Technology Consortium, 1999.
"Full Service Direct Deposit," www.nonprofitstaffing.com/images/upload/dirdepform.pdf, 2001.
Craig, Ben; "Resisting Electronic Payment Systems: Burning Down the House?", Federal Reserve Bank of Cleveland, Jul. 1999.
Rose, Sarah et al., "Best of the Web": The Top 50 Financial Websites. Money, New York Dec. 1999, vol. 28, iss12; pp. 178-187.
Furst, Karen et ai., "Internet Banking: Developments and Prospects", Office of the Comptroller of the Currency—Economic and Policy Analysis Working Paper 2000-Sep. 9, 2000.
Middleware', URL: http://www.cs.umanitoba.ca/maheswar/anc2002/PAPERS/bako1.pdf, Jun. 24, 2008.
Palacios, Rafael et aI., "Automatic Processing of Brazilian Bank Checks", Machine Vision and Applications; 2002, pp. 1-28.
Peter, J. Wallison, "Wal-Mart Case Exposes Flaws in Banking-Commerce Split", American Banker, vol. 167. No. 8, Jan. 17, 2002.
Heckenberg, D., "Using Mac OSX for Real-Time Image Processing," 2003.
Burnett, J., "Depository Bank Endorsement Requirements," Bankersonline.com, http://www.bankersonline.com/cgi-ban/printview.pl, 2003.
Blafore, Bonnie, "Lower Commissions, Fewer Amenities." Better Investing. Madison Heights: Feb. 2003, vol. 52, iss 6; pp. 50-51.
"Direct Deposit Authorization Form" www.umass.edu/humres/library/DDForm.pdf, 2003.
Electronic Billing Problem: The E-check is in the mail-American Banker-v168, n 95, 91, May 2003.
Oxley, Michael G., from committee on Financial Services; "Check Clearing For The 21st Century Act", 108th Congress—1st session, House of Representatives, report 108-132, Jun. 2, 2003, pp. 1-20.
Shelby, Hon. Richard C. (Chairman, Committee on Baking, Housing and Urban Affairs); "Check Truncation Act of 2003", calendar No. 168, 108th Congress, 1st Session Senate report 108-79, Jun. 25, 2003.
Knestout, Brian P. et aI., "Banking Made Easy" Kiplinger's Personal Fiance, Washington :Jul. 2003, vol. 57 iss 7; pp. 44-47.
Oxley, Michael G, from the committee of conference; "Check Clearing For The 21st Century Act", 108th Congress- 1st Sessi9n, House of Representatives, Report 108-291, Oct. 1, 2003, pp. 1-27.
Public Law 108-100—108th Congress; "An Act-Check Clearing For The 21st Century Act". Oct. 28, 2003, [H. R. 1474], 117 Stat. 1177, 12 USC 5001.
Mohl, Bruce, "Banks Reimbursing ATM Fee to Compete With Larger Rivals." Boston Globe, Boston, MA., Sep. 2004, pp. 1E.
The Automated Clearinghouse, "Retail Payment Systems; Payment Instruments, Clearing and Settlement; The Automated Clearinghouse (ACH)," www.ffiec.gov/ffiecinfobase/booklets/retailretail_02d.html, Dec. 2005.
"Two Words Every Business Should Know: Remote Deposit," Canon, http://www.rpsolutions.com/rpweb/pdfs/ canon_rdc.pdf, 2005.
Wells Fargo 2005 News Releases, "The New Wells Fargo Electronic Deposit Services Break Through Banking Boundaries In The Age of Check 21", San Francisco Mar. 28, 2005, wwwwellsfargo.com/press/3282005_check21?year=2005.
Constanzo, Chris "Remote Check Deposit: Wells Captures A New Checking Twist", Bank Technology News Article—May 2005. www.americanbanker.com/btn_article.html?id=20050502YQ50FSG>.
Integrated Data, Message, and Process Recovery for Failure Masking in Web Services, Dissertation zur Erlangung des Grades des Doktors der Ingenieurwissenschaften der Naturwissenschaftlich-Technischen Fakultat I der Universitat des Saari andes, Saarbrucken, im Jul. 2005.

Credit Union Journal, "AFCU Averaging 80 DepositHome Transactions Per Day", Credit Union Journal, Aug. 15, 2005.

Federal Check 21 Act, "New Check 21 Act effective Oct. 28, 2004: Bank No Longer Will Return Original Cancelled Checks," Consumer Union's FAQ's and Congressional Testimony on check 21, www.consumerlaw.orglinitiativeslcontentlcheck21-content.html.

BankServ, "depositNow: What's the difference?", 2006, DepositNow.

http://www.bankserv.com/products/remoteddeposithtm, 2006, Bankserv.

Blue Mountain Consulting, from URL: www.bluemountainconsulting.com. Apr. 26, 2006.

Remotedepositcapture, URL: www.remotedepositcapture.com, 2006.

Onlinecheck.com/Merchant Advisors, "real-Time Check Debit", Merchant Advisors: Retail Check Processing Check Conversion, http://www.onlinecheck/wach/rcareal.htm, 2006.

"Compliance with Regulation CC," http://www//federalreserve.org/Pubsregccregcc.htm, Jan. 24, 2006, 6 pgs.

Chiang, Chuck Chiang, The Bulletin, "Remote banking offered", Feb. 1, 2006, http://bendbulietin.com/apps/pbcs.dll/article? AID=/20060201/BIZ0102/60201 0327&tempi....

Federal Reserve Board, "Check Clearing for the 21st Century Act," FRB, http://www.federalreserve.gov/paymentsystems/turncation/, 2006.

Fest, G., "Patently Unaware," Bank Technology News, 412006, Retrieved from the internet at URL: http://banktechnews.com/article.html?id=20060403T7612618.

Bank Systems & Technology, Untitled Article, 5/112006, http://www.banktech.com/showarticle.jhtml? articleID=187003126>, pp. 1-4, Copyright 2004-2005 CMP Media, LLC.

Digital Transactions News, "An ACH-Image Proposal for Check Roils Banks and Networks", May 26, 2006.

BankServ Press release, "BankServ Announces New Remote Deposit Product Integrated With QuickBooks", San Francisco, Jul. 6, 2006, Remotedepositcapture.com, pp. 1-3.

Remote Deposit Capture News Article, "PNC Bank to Offer Ease of Online Deposit Service Integrated with QuickBooks to Small Businesses", Remote Deposit Capture News Articles from 7/2412006, remotedepositcapture.com, pp. 1-2.

Dias, Danilo et al., "A Model for the Electronic Representation of Bank Checks", Universidade de Brasilia.

"Adjusting Brightness and Contrast", www.eaglesoftware.com.

Mitek systems, Imagenet Mobile Deposit', San Diego, CA. 2 Pages.

Fisher, Dan M "Home Banking in the 21st century: Remote Capture Has Gone Retail" , 4 pages.

Affinity Federal Credit Union, "Affinity announces online deposit," Aug. 4, 2005, Affinity Federal Credit Union.

"check 21—The check is not in the post", RedTitan Technology 2004./http://www.redtitan.com/check21/htm, 3 pgs.

Hartly, Thomas, "Banks Check Out New Image", Business First, Buffalo: Jul. 16, 2004, vol. 20, Iss 43, p. 1 , 3 pages.

Wade, Will, "Early Notes: Updating Consumers on Check 21" American Banker Aug. 10, 2004 (3 pages).

Federal Check 21 Act, "New Check 21 Act Effective Oct. 28, 2004: Banks No Longer Will Return Original Cancelled Checks," Consumer Union's FAQ's and Congressional Testimony on Check 21, www.consumerlaw.org/initiatives/content/check21_content.html, downloaded Dec. 2005, 20 pages.

The Automated Clearinghouse, "Retail Payment Systems; Payment Instruments, Clearing and Settlement; The Automated Clearinghouse (ACH)," www.ffiec.gov/ffiecinfobase/booklets/Retail/retail_02d.html, downloaded Dec. 2005, 3 pages.

Fest, G., "Patently Unaware," *Bank Technology News*, Apr. 2006, Retrieved from the Internet at URL: http://banktechnews.com/article.html?id=20060403T7612618, 5 pages.

Website: Blue Mountain Consulting, URL: www.bluemountainconsulting.com/, Downloaded Apr. 26, 2006, 3 pages.

* cited by examiner

SYSTEMS AND METHODS FOR DISPLAYING NEGOTIABLE INSTRUMENTS DERIVED FROM VARIOUS SOURCES

CROSS REFERENCE TO RELATED APPLICATIONS

This application is related to subject matter disclosed in the following commonly assigned applications: U.S. patent application Ser. No. 11/321,025, filed Dec. 29, 2005, entitled "Remote Deposit of Checks," U.S. patent application Ser. No. 11/321,027, filed Dec. 29, 2005, entitled "Remote Deposit of Checks," and U.S. patent application Ser. No. 11/320,998, filed Dec. 29, 2005, entitled "Remote Deposit of Checks." and U.S. patent application Ser. No. 11/591,131, filed Oct. 31, 2006, entitled "Remote Deposit of Checks."

Additionally, this application is related to subject matter disclosed in the following commonly assigned applications: U.S. patent application Ser. No. 11/591,014, filed Oct. 31, 2006, entitled "Systems and Methods for Remote Deposit of Checks," U.S. patent application Ser. No. 11/590,971, filed Oct. 31, 2006, entitled "Systems and Methods for Remote Deposit of Checks," U.S. patent application Ser. No. 11/591,247, filed Oct. 31, 2006, entitled "Systems and Methods for Remote Deposit of Checks," U.S. patent application Ser. No. 11/591,003, filed Oct. 31, 2006, entitled "Systems and Methods for Remote Deposit of Checks" and U.S. patent application Ser. No. 11/590,974, filed Oct. 31, 2006, entitled "Systems and Methods for Remote Deposit of Checks," U.S. patent application Ser. No. 11/590,963, filed Oct. 31, 2006, entitled "Systems and Methods for Remote Deposit of Checks," and U.S. patent application Ser. No. 11/591,025, filed Oct. 31, 2006, entitled "Systems and Methods for Remote Deposit of Checks."

Additionally, this application is related to subject matter disclosed in the following commonly assigned application: U.S. patent application Ser. No. 11/591,273, filed Oct. 31, 2006, entitled "Systems and Methods for Remote Deposit of Negotiable Instruments with Non-Payee Institutions."

Additionally, this application is related to subject matter disclosed in the following commonly assigned applications: U.S. patent application Ser. No. 11/591,262, filed Oct. 31, 2006, entitled "Systems and Methods for Clearing Negotiable Instruments In Lieu of Using Digital Images," U.S. patent application Ser. No. 11/591,227, filed Oct. 31, 2006, entitled "Systems and Methods for Clearing Negotiable Instruments In Lieu of Using Digital Images," U.S. patent application Ser. No. 11/591,261, filed Oct. 31, 2006, entitled "Systems and Methods for Clearing Negotiable Instruments In Lieu of Using Digital Images."

Additionally, this application is related to subject matter disclosed in the following commonly assigned applications: U.S. patent application Ser. No. 11/590,998, filed Oct. 31, 2006, entitled "Systems and Methods for Displaying Instruments Derived From Various Sources," and U.S. patent application Ser. No. 11/591,228, filed Oct. 31, 2006, entitled "Systems and Methods for Displaying Instruments Derived From Various Sources."

BACKGROUND

Negotiable instruments, such as checks, for example, typically provide a safe and convenient method for individuals to purchase goods and/or services. To use a check, an individual usually must open a checking account, or other similar account, at a financial institution and deposit funds, which are then available for later withdrawal. To pay for goods and/or services with a check, a payor (i.e., a buyer) usually designates a payee (i.e., a seller) and an amount payable on the check. In addition, the payor often signs the check. Once the check has been signed, it is usually deemed negotiable, meaning the check may be validly transferred to the payee upon delivery. By signing and transferring the check to the payee, the payor authorizes funds to be withdrawn from the payor's account on behalf of the payee in return for the goods and/or services provided by the payee.

Negotiable instruments, such as checks, have certain advantages over other forms of payment, such as cash. For example, while often considered the most liquid type of asset, cash also may be the least secure. Unlike a check, for instance, cash is usually freely transferable and does not have to be endorsed. Thus, an owner and possessor of cash is most often the same individual. Because cash is freely transferable, cash that is lost or stolen typically cannot be recovered. Therefore, the risks associated with cash transactions are often undesirable, particularly with respect to transactions not conducted in person (e.g., by mail) and/or involving large sums of money. A check, on the other hand, provides a payor with more security because the check usually requires a payor to specify both the person and amount to be paid. Furthermore, as noted above, the check is usually not valid until it is properly signed by the payor. These safeguards help to reduce the risk that money will be lost and/or stolen and ensure that the proper payee receives the proper amount of money.

Cash may have other disadvantageous as well. For example, because cash is freely transferable, there may be little or no verifiable transaction history. It is often desirable for a payor and/or payee to have physical proof that a particular transaction took place. This typically requires that the payor receive a receipt. However, receipts may contain errors and can be easily misplaced. In contrast, a bank processing a check will ordinarily create a transaction history, which may include the identity of the payee, the amount to be paid, the date of the payment, and the signature of the payor. This enables both a payor and payee to independently verify the accuracy of most transactions involving a payment by check.

While a check may provide a payor with a convenient and secure form of payment, receiving a check may put certain burdens on the payee, such as the time and effort required to deposit the check. For example, depositing a check typically involves going to a local bank branch and physically presenting the check to a bank teller or an ATM. In addition to the time commitment that may be required, visiting a bank branch may be problematic for the payee if the bank's hours of operation coincide with the payee's normal hours of employment. Thus, the payee may be required to leave work early and/or change work schedules.

A check may pose other burdens for the payee. As noted above, a check may not be freely transferable, thereby limiting the payee's ability to use funds from the check. For example, it is usually difficult to for the payee to purchase goods and/or services using a check issued by the payor. While the check may be endorsed and accepted by a third party, such transactions are often disfavored because the third party may not know the payor and, thus, may not be willing to accept the risk that the payor has sufficient funds to cover the check. Therefore, the payee may not have access to the funds from the check until the payee deposits the check at the bank, the check has cleared and the funds have been credited to the payee's account. The payee may have to wait even longer if the payee chooses to deposit the check by mail.

Even if the payee deposits a check with a payee bank, this may not be as advantageous, in some instances, as depositing the check with other non-payee banks, such as payor banks, intermediate banks, or third-party enterprises. For example, a payor bank may be a more convenient place or site to deposit a check. Additionally, it may provide for faster access to funds upon deposit.

If a payee deposits a check, this check can be cleared by sending a digital image of the check from a payee bank to some bank downstream. However, since digital images may be large and/or may lack the required resolution to act as substitute checks, other ways of clearing checks without using digital images is needed.

Finally, given the large volume of checks that a member may come across, the member may not be aware of the various different sources from which the checks were either drawn on the member's account or deposited to the member's account.

Therefore, there is a need for mechanisms for remotely depositing negotiable instruments, such as checks, with non-payee financial institutions, being able to clear checks without relying on digital images, and being able to display checks associated with an account no matter the source of the checks.

SUMMARY

The described aspects herein contemplate systems, methods and computer-readable media with computer-executable instructions that display negotiable instruments derived from various sources. By way of example and not limitation, a bank member can draft a check and have that check displayed at his banking institution; however, in addition, this bank member can also display any other checks that the member has received. In fact, any check that is either credited or debited from the member's account can appear as a digital image for inspection by the member. Furthermore, any images of check residing at other banking institutions can be synchronized with the member's institution to amount to a one-stop warehouse for digital images of negotiable instruments for inspection by the member, no matter from where these negotiable instruments may originate (whether payors, payees, or other parties).

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed or shown. The following figures are included.

DETAILED DESCRIPTION

Subject matter of the disclosed aspects herein is provided with specificity to meet statutory requirements. However, the Detailed Description itself is not intended to limit the scope of this disclosure. Rather, the inventors have contemplated that the claimed subject matter might also be embodied in other ways, to include different steps or elements similar to the ones described herein, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Furthermore, although certain terms of art are used herein, it is also understood that the presently disclosed subject matter is not limited to uses synonymous with these terms. For example, the broad notion of "negotiable instruments" is used herein, and specifically, "checks," however, the present disclosure is not limited to "negotiable instruments" or "checks." In fact, any transactional mechanisms for transacting financial transactions are contemplated herein, whether "negotiable instruments," "checks," or otherwise.

Depositing Negotiable Instruments with Financial Institutions

Figure 1:
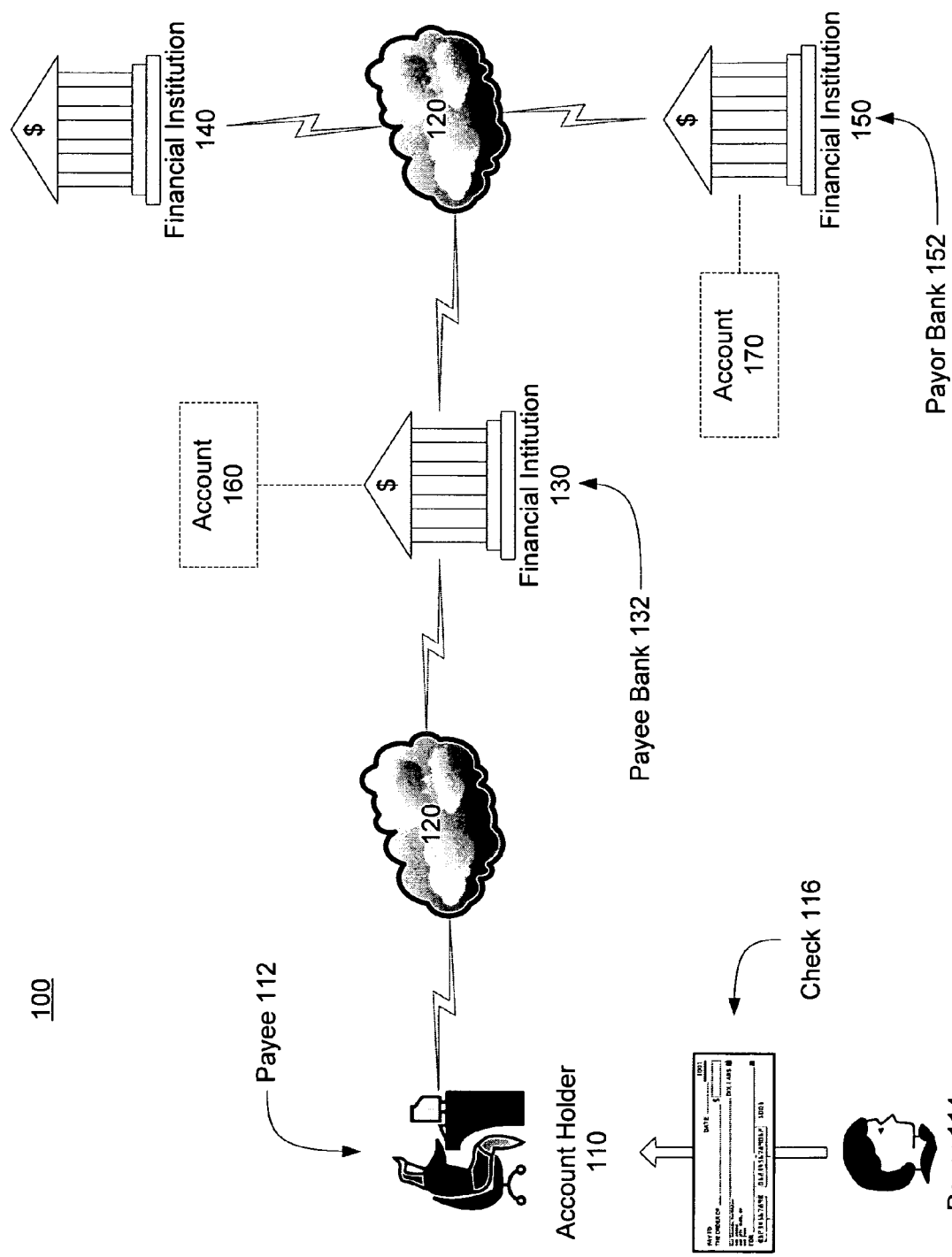
FIG. 1 is a diagram illustrating an exemplary system in which aspects of the present disclosure may be incorporated.

Turning now to FIG. 1, an exemplary system is shown for remotely depositing negotiable instruments with financial institutions. System 100 may include a computer user, such as an account holder 110, and various financial institutions 130, 140, 150. These institutions 130, 140, 150 may be any type of entities capable of processing a transaction involving negotiable instruments. For example, financial institutions 130, 140, 150 may be retail banks, investment banks, investment companies, regional branches of the Federal Reserve, clearinghouse banks and/or correspondent banks. In one aspect of the presently disclosed subject matter, negotiable instruments disclosed herein may be understood in broad terms to be types of contracts that obligate one party to pay a specified sum of money to another party. By way of example, and not limitation, negotiable instruments may include checks, drafts, bills of exchange, promissory notes, and the like.

An account holder 110 may be an individual who owns an account 160 or is given permission to manage the account 160 (if, for example, the account 160 is a trust account). This account 160 may be held at financial institution 130. For example, account 160 may be any type of account for depositing funds, such as a savings account, checking account, brokerage account, and the like. The account holder 110 may communicate with the financial institution 130 by way of communication network 120, which may include a local area network (LAN), a wide area network (WAN), a public switched telephone network (PSTN), a cellular network, a voice over internet protocol (VoIP) network, and the like, as is discussed in more detail below. Moreover, the account holder 110 may communicate with the financial institution 130 using a variety of mechanisms, such as phone, email, instant messaging, facsimile, and the like. The financial institutions 130, 140, 150 also may communicate with each other by way of similar or different communications networks 120.

In one aspect of the present disclosure, the account holder 110 may be a payee 112, and may receive a check 116 from a payor 114. The payor 114, in turn, make have his or her account at a different financial institution 150 (with a corresponding account 170). Thus, the check 116 may be drawn on account 170 at financial institution 150. The account holder 110 may endorse the check (e.g., sign the back of the check) and indicate an account number on the check for depositing the funds. The account holder 110 may deposit the check 116 into account 160 by converting the check into electronic data (a digital image and/or data and/or metadata) and sending the electronic data to financial institution 130 (as is shown in more detail in later figures).

For example, after endorsing the check 116, the account holder 110 may convert the check 116 into a digital image by scanning the front and/or back of the check 116. Account owner 110 may then attach the digital image to an email and send the image to financial institution 130. Upon receipt of the image, financial institution 130 may credit the funds to account 160. Financial institution 130 may clear the check 116 by presenting the digital image to an intermediary bank, such as a regional branch of the Federal Reserve, a correspondent bank and/or a clearinghouse bank.

For example, the check 116 may be cleared by presenting the digital image to financial institution 140, which may be a regional branch of the Federal Reserve, along with a request for payment. Financial institution 130 and 150 may have accounts at the regional branch of the Federal Reserve. As will be discussed in greater detail below, financial institution 130 may create a substitute check using the image provided by account holder 110 and present the substitute check to financial institution 140 for further processing.

Upon receiving the substitute check, financial institution 140 may identify financial institution 150 as the paying or "payor" bank 152 (e.g., the bank from which the check 116 is drawn). This may be accomplished using a nine-digit routing number located on the bottom left hand corner of the check 116. A unique routing number is typically assigned to every financial institution in the United States. Financial institution 140 may present the substitute check to financial institution 150 and request that the check be paid. If financial institution 150 verifies the check (i.e., agrees to honor the check), financial institution 140 may then settle the check by debiting funds from financial institution 150 and crediting funds to financial institution 130. Financial institution 150 may then debit funds from account 170.

It will be appreciated that the preceding examples are for purposes of illustration and explanation only, and that the various aspects of the present disclosure provided herein are not limited to such examples. For instance, financial institution 150 may be a correspondent bank (i.e., engaged in a partnership with financial institution 130). Thus, financial institution 130 may bypass the regional branch of the Federal Reserve and clear the check directly with financial institution 150. In addition, account 160 and account 170 may both be held at financial institution 130, in which case the check may be cleared internally.

Figure 2A:
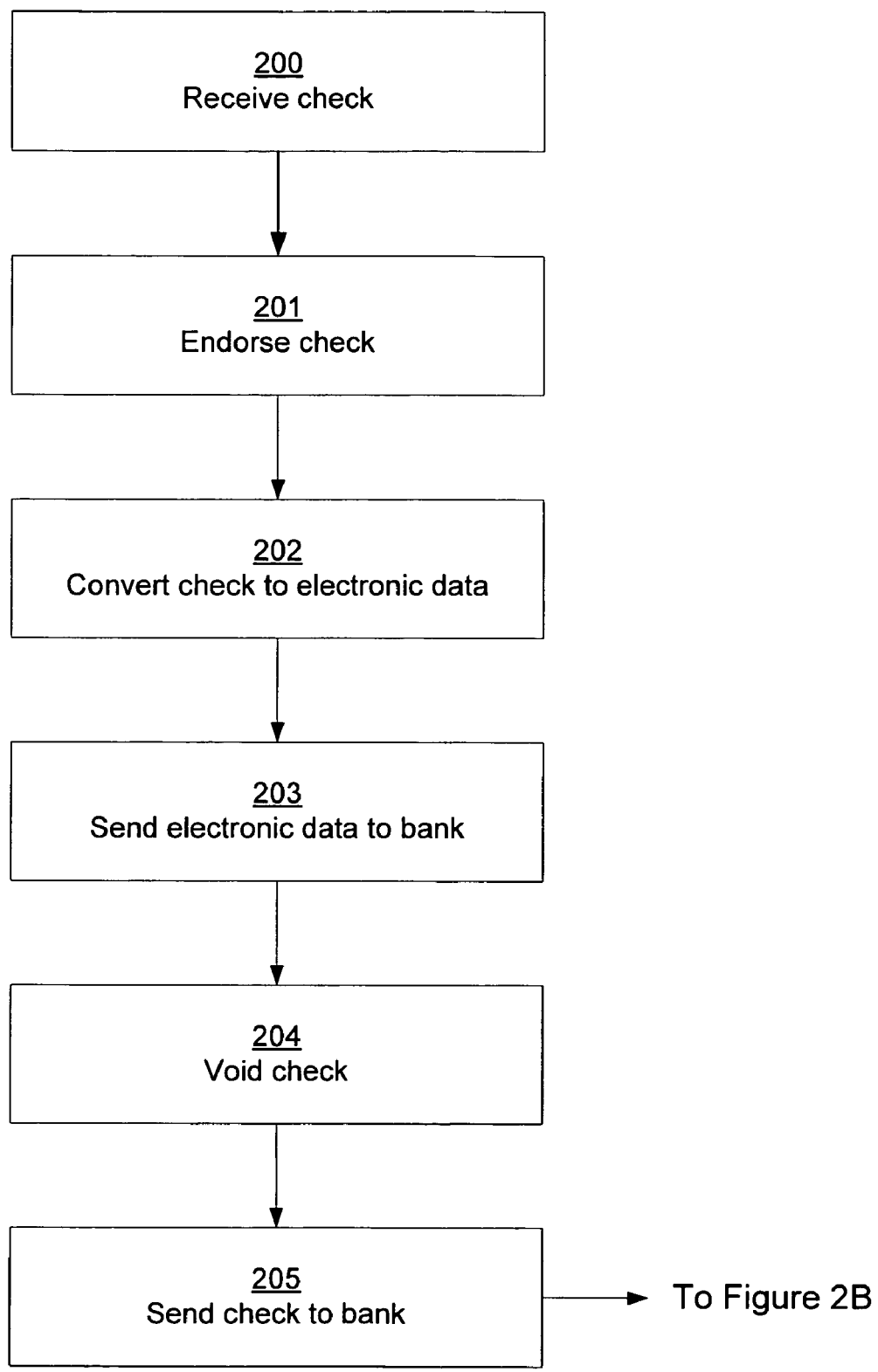
FIG. 2A is a flow diagram illustrating an exemplary method of remotely depositing checks.

FIG. 2A is a flow diagram illustrating an example method of remotely depositing checks, whether such checks are deposited to a payee financial institution or a non-payee financial institution (such as a payor bank, an intermediate bank, or some third party enterprise). As shown in FIG. 2A, at 200, an account holder or owner (e.g. the payee) may receive a check from a third party (e.g. the payor). At 201, the payee may endorse the check by signing the back of the check in the designated field. If the payee wishes to deposit the check into an account, such as a savings and/or checking account, the payee also may write an account number below the signature. At 202, the payee may convert the check into electronic data. This may be accomplished in any number of ways. For example, the payee may create a digital image of the first side of the check, the second side of the check, or both. The digital image may be created using a general purpose flatbed scanner, digital camera, photocopier, fax machine, video equipment, and the like.

The payee also may convert the check into electronic data by scanning the check using a Magnetic Ink Character Recognition (MICR) device. Checks typically contain MICR information (e.g., routing number, account number and check number) on the bottom left-hand corner of the check. The MICR information usually consists of characters written in a magnetic ink. The MICR information may be read electronically by passing the check through the MICR device, which may translate the characters by magnetizing the ink.

Thus, it should be noted that the term "electronic data" encompasses not only digital images, but any other data related to a negotiable instrument—namely, in the case of checks, MICR information. These two kinds of information, digital images and MICR information (or alpha-numeric data), may be sent to a financial institution together, separately, or in lieu of one another. Additionally, a third kind of electronic data may be used, namely, metadata related to the check. This metadata may contain information related to the maker of the check, the maker's name (if, for example, it is not clear from the digital image), address, banking information (perhaps other related accounts), credit history, and so on. This latter type of data may also contain instructions from the maker or the person submitting the check to the financial institution.

As shown in FIG. 2A, at 203, the payee may send the electronic data to a bank that is associated with an account for depositing funds. As is explained below, this bank may be a payee bank, a payor bank, an intermediary bank, or some third party enterprise. Any means for transmitting electronic data over a communications network is consistent with this aspect of the present disclosure. For example, if the payee creates a digital image of the check, the image may be sent to the bank by attaching the image to an email. If the electronic data is in the form of MICR information captured by a MICR device, the device may have an output component for transmitting the electronic data to the bank over the communications network. Additionally, the electronic data may include information pertaining to the account for depositing funds, such as the account number and/or the name on the account. The account number may appear on the check itself, below the signature endorsing the check. The account number and/or name on the account also may appear in an email, either with or without the digital image, for example.

At 204, the payee may void the check. For example, the payee may write and/or stamp "void" on the check, or alternatively, use a device for automatically voiding the check (for instance, a combination scanner/printer to scan a check and then print "void" on it). Alternatively, special paper may be used where after scanning is performed, a void watermark appears on the check. In any case, at 205, the payee may send the check to a financial institution associated with the account for depositing funds (or alternatively, to a general account for depositing checks). The check may be sent via a common carrier, such as the United States Post Office, FedEx®, United Parcel Service®, and the like. The process may then proceed to 206. It will appreciated that 204 and 205 may be performed to provide additional security features. For example, by removing the check from circulation, it may be less likely that the check will be deposited more than once.

Figure 2B:
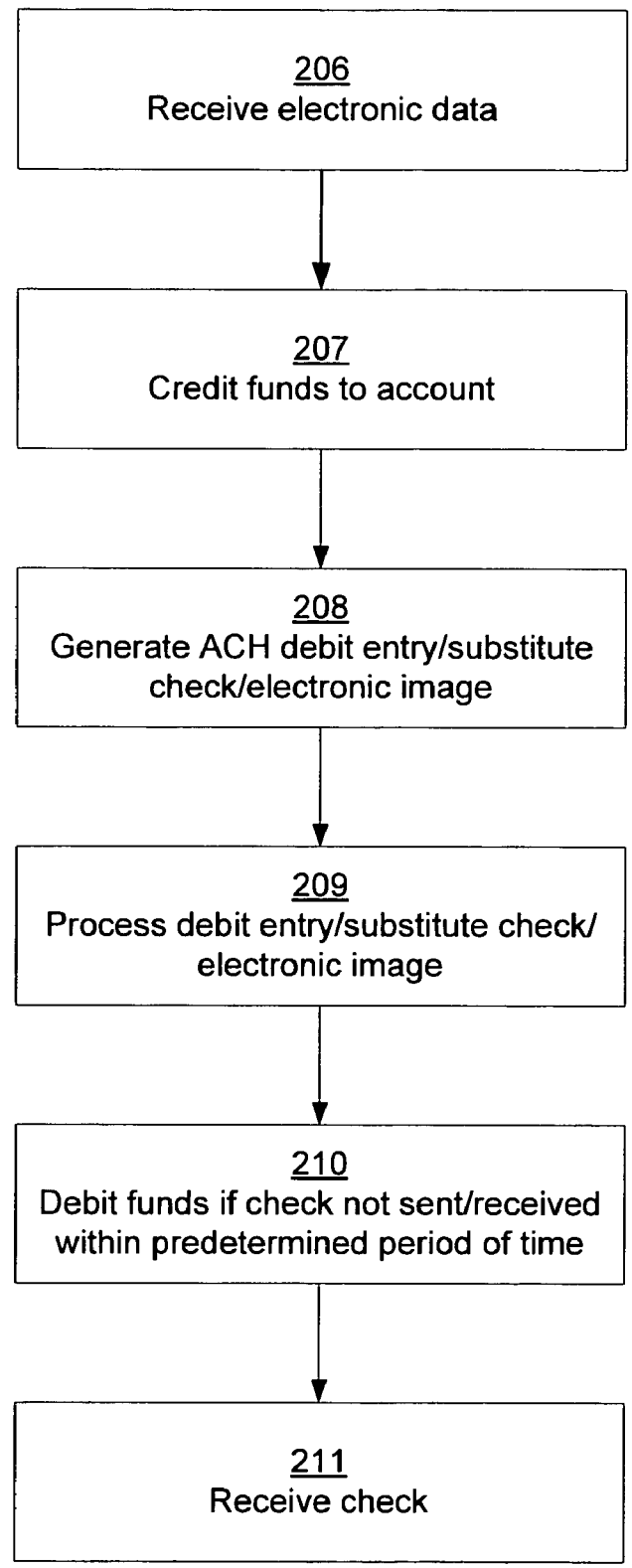
FIG. 2B is a flow diagram illustrating an exemplary method of remotely depositing checks.

FIG. 2B is a flow diagram illustrating an exemplary method of remotely depositing checks. As shown in FIG. 2B, at 206, the bank may receive the electronic data representative of the check along with information pertaining to the account for depositing funds. At 207, the bank may credit funds to the account. The credit may be a provisional credit, enabling the payee to access the funds while the check is being cleared. A provisional credit may later be voided if the bank determines that the transaction is erroneous and/or fraudulent.

At 208, the bank may generate an Automated Clearinghouse (ACH) debit entry, substitute check, and/or electronic image. ACH transactions typically include payment instructions to debit and/or credit an account. Banks often employ ACH service providers to settle ACH transactions. Examples of ACH service providers include regional branches of the Federal Reserve and the Electronic Payments Network (EPN). In one aspect of the presently disclosed subject matter, a payee may receive a check in return for the sale of goods, such as a used car, for example. The payee may endorse the check and/or send electronic data representative of the check to the payee's, payor's, or an intermediate bank which may be referred to as the originating depository financial institution (ODFI).

As noted above, the electronic data may be generated in any number of ways. For example, the payee may use a MICR device to scan and translate the MICR information (e.g., account number, routing number, check number, etc.) located on the check and transmit the data to the desired bank along with information pertaining to the account for depositing funds. Upon receipt of the MICR information and account information, the bank may credit funds to the payee's account and generate an ACH debit entry to the payor's account, which may be presented to the ACH service provider for processing. In the case where a deposit is made directly to the payor bank, any of these intermediate points of transaction can either greatly reduced or obviated outright.

In the case where the ACH service provider is used, it may process the debit entry by identifying the account and bank from which the check is drawn. The bank from which the check is drawn (i.e., the payor's bank) may be referred to as a receiving depository financial institution (RDFI). If the payor's bank verifies the transaction, the ACH service provider may settle the transaction by debiting the payor's bank and crediting the payee's bank. The payor's bank may then debit the payor's account.

A substitute check can be a paper reproduction of an original check based on an electronic image of the original check, and may be the legal equivalent of the original check. Substitute checks were authorized under The Check Clearing for the 21st Century Act, commonly known as Check 21. The Act was enacted to facilitate the check clearing process by allowing banks to transmit electronic images of checks to other banks rather than physically sending the original paper checks. Check 21 does not require that banks use substitute checks. In fact, many banks may have voluntary agreements to accept certain electronic images of checks even though the images may not qualify as substitute checks under Check 21.

In another aspect of the presently disclose subject matter, a payee may receive a check, for example, as a birthday gift. The payee may endorse the check and/or send electronic data representative of the check to the payee's bank, payor's bank, any intermediate bank, or some third party enterprise. As noted above, the electronic data may be generated in any number of ways. For example, the payee may use a general purpose flatbed scanner and/or digital camera to create a digital image of the front and back of the check. The payee may then attach the digital images to an email and send the digital image to the payee's bank along with information pertaining to the account for depositing funds. Upon receipt of the digital images and/or account information, the payee's bank, for example, may credit funds to the payee's account. If the payee's bank and the payor's bank have a voluntary agreement for accepting electronic images of checks, the payee's bank may generate an electronic image of the check and/or simply forward the digital images received from the payee to the payor's bank. If there is no agreement between the banks, the payee's bank may convert the digital images into a substitute check and present the substitute check to the payor's bank and/or a check clearing service provider (e.g., a regional branch of the Federal Reserve) to clear the check.

Returning to FIG. 2B, at 209, the bank may process the ACH debit entry, substitute check (paper or electronic image). As noted above, the bank may present the ACH debit entry to an ACH service provider (e.g., EPN), which may be responsible for settling the transaction between the payee's bank and the payor's bank. The bank also may convert the digital image into a hardcopy substitute check and present the substitute check to an intermediary bank (e.g., a regional branch of the Federal Reserve) to complete the check clearing process.

At 210, the bank may debit the payee's account if the original check is not received and/or sent within a predetermined period of time. For example, the bank may require that the payee send the check and have it postmarked within five business days of sending the electronic data representative of the check. If the check is not postmarked within the predetermined period of time, the financial institution may void the provisional credit (e.g., withdraw funds from the account). At 211, the financial institution may receive the check from the payee. It will appreciated that 210 and 211 may be performed to provide additional security features by removing the check from circulation.

Figure 3A:
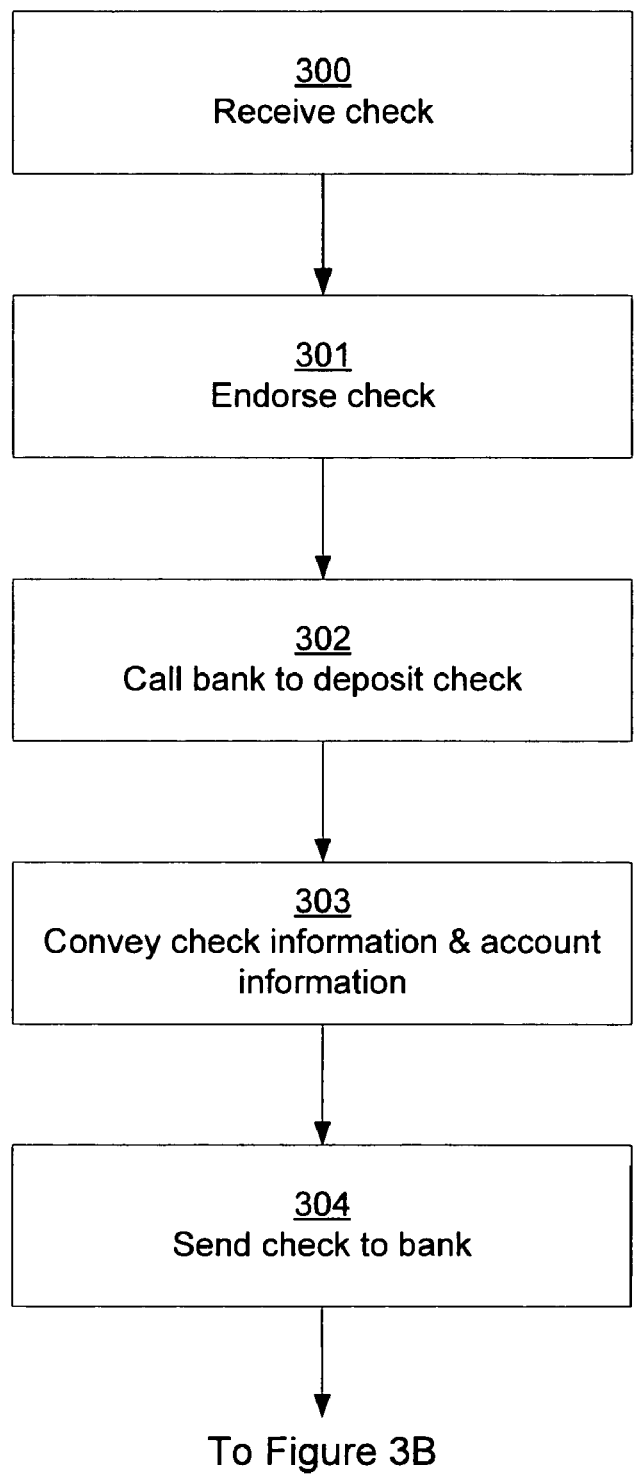
FIG. 3A is a flow diagram illustrating an alternative aspect of an exemplary method of remotely depositing checks.

FIG. 3A is a flow diagram illustrating an alternative aspect of an exemplary method of remotely depositing checks. As shown in FIG. 3A, at 300, a payee may receive a check from a third party payor. At 301, the payee may endorse the check by signing the back of the check in the designated field. If the payee wishes to deposit the check into an account, such as a savings and/or checking account, the payee also may write an account number below the signature. At 302, the payee may call a bank associated with an account for depositing funds and request that the check be deposited into the account. Any method of contacting the bank is consistent with this aspect—for example, phone, email, instant messaging, and/or a fax machine to make the request.

At 303, the payee may convey the check information and/or information pertaining to the account for depositing funds. For example, the payee may convey the MICR information (e.g., account number, routing number, check number, etc.) on the check. In addition, the payee may convey the account number of the account where the funds are to be deposited. Any method of conveying the information is consistent with this aspect. At 304, the payee may void the check and/or send the check to the bank. The process may then proceed to 305.

It will be appreciated that 304 may be performed to provide additional security features. For example, by removing the check from circulation, it may be less likely that the check will be (willfully or accidentally) deposited more than once. In addition, by requiring the payee to produce the check, the financial institution may prevent the deposit of fraudulent checks.

Figure 3B:
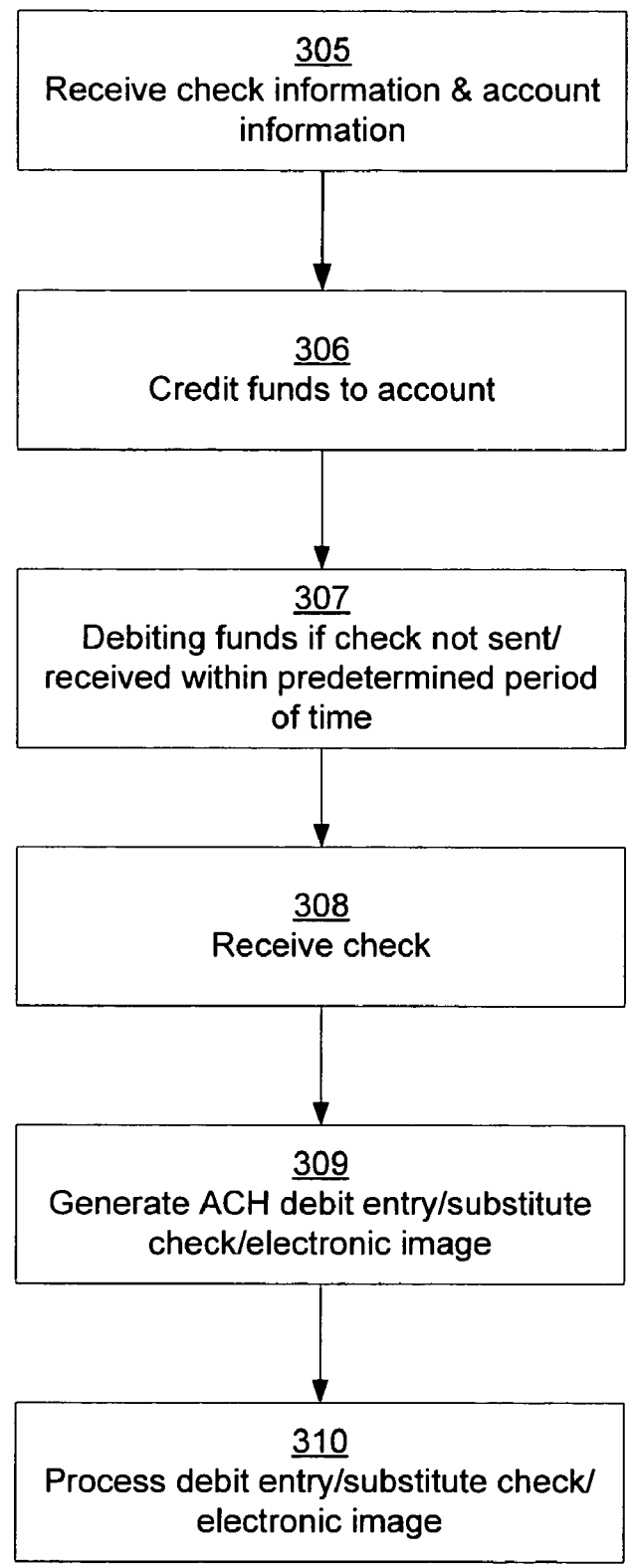
FIG. 3B is a flow diagram illustrating an alternative aspect of an example method of remotely depositing checks.

FIG. 3B is a flow diagram illustrating an alternative aspect of an example method of remotely depositing checks. As shown in FIG. 3B, at 305, the bank may receive the check information and account information. At 306, the bank may credit funds to the account. As noted above, the credit may be a provisional credit, enabling the payee to access the funds while the transaction is being processed. At 307, the bank may void the provisional credit if the original check is not sent and/or received within a predetermined period of time. At 308, the bank may receive the check. At 309, the bank may generate an ACH debit entry, substitute check, and/or electronic image. At 310, the bank may process the ACH debit entry, substitute check, and/or electronic image. It will appreciated that 307 and 308 may be performed to provide additional security features.

Other security features may be consistent with an embodiment. For example, the bank may only permit certain payees to remotely deposit checks. By way of example, and not limitation, the bank may accept electronic data representative of a check and/or accept a request to deposit a check if the payee's account is in good standing. The payee's account may be considered in good standing if the payee has a positive account balance, has a predetermined amount of funds in the account, and/or is not delinquent on any payments to the bank. The bank also may receive the electronic data and/or request but credit funds to the account if the account is in good standing as of the time the electronic data and/or request was received. In addition, the bank may impose additional requirements on a payee remotely depositing a check into an account that is not in good standing. For example, as noted above, the bank may provisionally credit the payee's account upon receipt of the electronic data and/or request but may require the payee to send the check to the bank. Thus, the account may be debited if the check is not sent and/or received within a predetermined amount of time.

Figure 4:
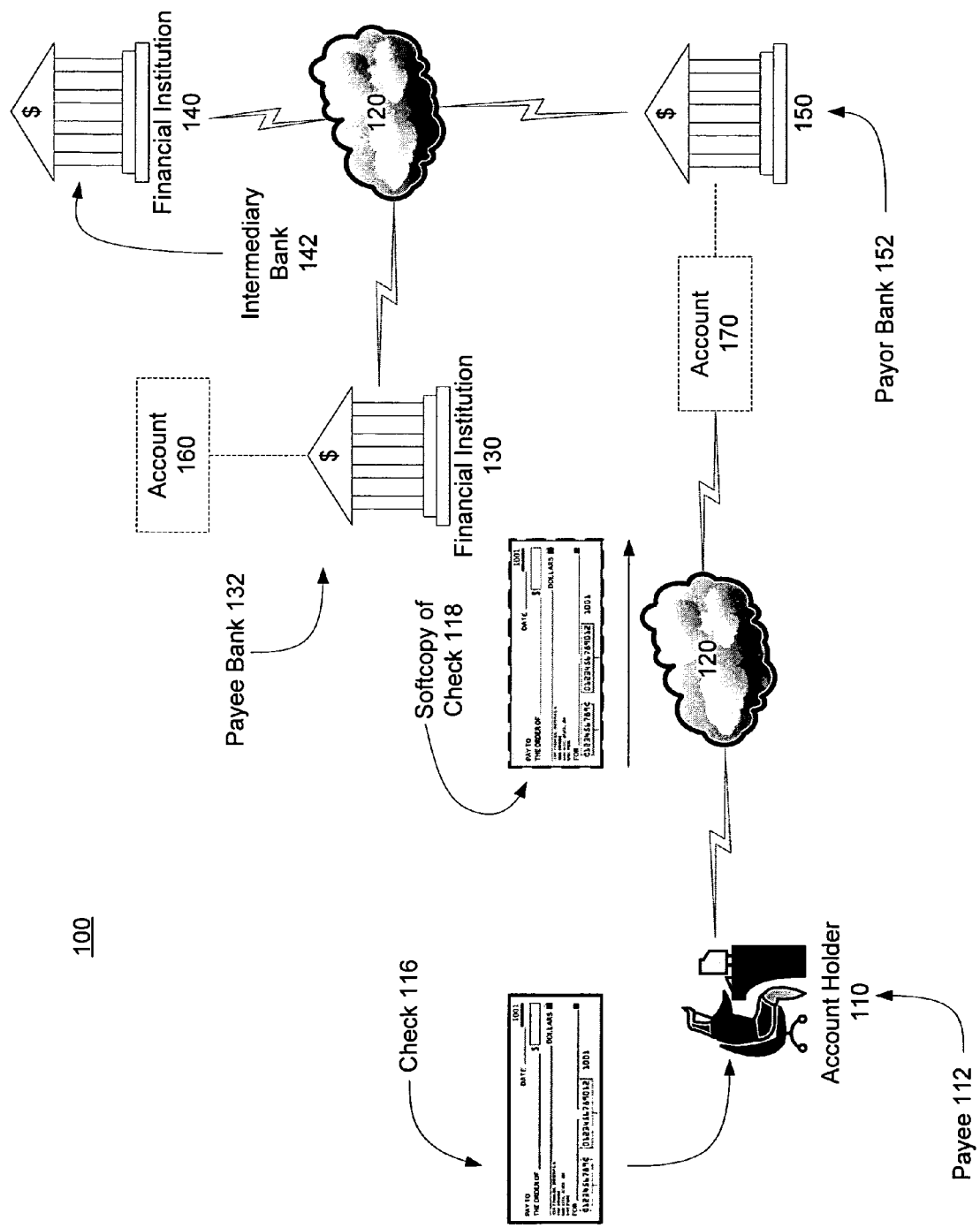
FIG. 4 illustrates account holders/payees directly depositing negotiable instruments with payor financial institutions.

Remotely Depositing Negotiable Instruments with Non-Payee Financial Institutions In another aspect of the presently disclosed subject matter, as is shown in FIG. 4, the account holder 110, who may be a payee 112, may directly deposit a check 116, in the form of a digital image or softcopy of the check 118, with a financial institution 150 that may be a payor bank 152. As mentioned, this may be done by scanning the front and/or back of the check 116, turning a physical check into a softcopy of the check, and then directly sending softcopy of check 118 to the account 170 in financial institution 150, designated as the payor bank 152. Thus, instead of depositing check 116 with the payee bank 132 (i.e. financial institution 130), the deposit can be made with the bank associated with a payor (shown in FIG. 1 as payor 114). One advantage of this direct deposit method is that the payee can obviate any transactions costs that are associated with a more indirect deposit method, namely, deposit to the payee's bank 132.

Although traditionally payees deposit hardcopies of check with their own bank, i.e. payee bank, here payees distinguish over such traditional deposit methods in at least two ways: (1) they are depositing a softcopy of a check to a bank and not a mere hardcopy, and (2) moreover, they are depositing the softcopy of the check with payor's bank not merely the payee's bank (and as is described below, payees can also deposit the softcopy of the check with some intermediary bank or some third party processing enterprise that can forward the check to some financial institution).

Upon receipt of the check 116, the account holder 110 can transform a physical version of the check 116 into an electronic version or softcopy version of the check 118. The account holder 110 can perform this transformation by him or herself, using such equipment as scanners, digital cameras, video capturing devices, etc., or, alternatively, he or she may have some third party perform this transformation and either have the third party deposit the check on his or her behalf or deposit the check personally upon receipt of the transformed version. In any case, once the softcopy of the check 118 is obtained, it can be sent from the account holder 110 via communication network 120 to some account 170 associated with a payor bank 152. As will be shown below, other additional information can be submitted to the payor bank 152, including but not limited to data information (e.g. MICR data which may be alpha-numeric data) and/or metadata information associated with either check 116 and/or account holder 110.

The softcopy check 118, data and/or data and/or metadata can then be used, together, individually, or in some combination, to eventually credit the account holder 110 with the funds associated with the check 116. The funds could be credited to an account 160 associated with the account holder 110 or payee 112. It should be noted that an account holder 110 may often times overlap with the payee 112 (both may be the same person), however, in some instances they may differ. For example, a payee 112 may be a wife of a husband that has a bank account (account holder). These terms are used synonymously at times herein, according to the appropriate context of the present disclosure, however, those of skill in the art will readily appreciate instances where an account holder 110 may differ from a payee 112.

Once the payor bank 152 has obtained at least a softcopy of the check 118, it may start the process of clearing the check 116 and thus crediting any associated funds to the account holder 110. The payor bank 152 may do it either directly via the communication network 120 to the payee bank 132, or alternatively, it may first contact some intermediary bank 142. In one aspect of the present disclosure, the intermediary bank 142 may be a branch of the Federal Reserve bank; in another aspect, it may be still some other bank; in yet another aspect, the intermediary bank 142 may include a plurality of banks, whether branches of the Federal Revere bank, other associated banks, and so on.

In still another aspect of the presently disclosed subject matter, depositing checks 116 or other negotiable instruments with a non-payee bank or financial institution may allow for a more streamlined processing of negotiable instruments. For instance, instead of the payee bank having to send softcopy check images to payor banks or other intermediary banks, and then receiving any associated funds, all the payee bank has to do is just receive the funds. This cuts down substantially on transactions costs to payee banks.

Figure 5:
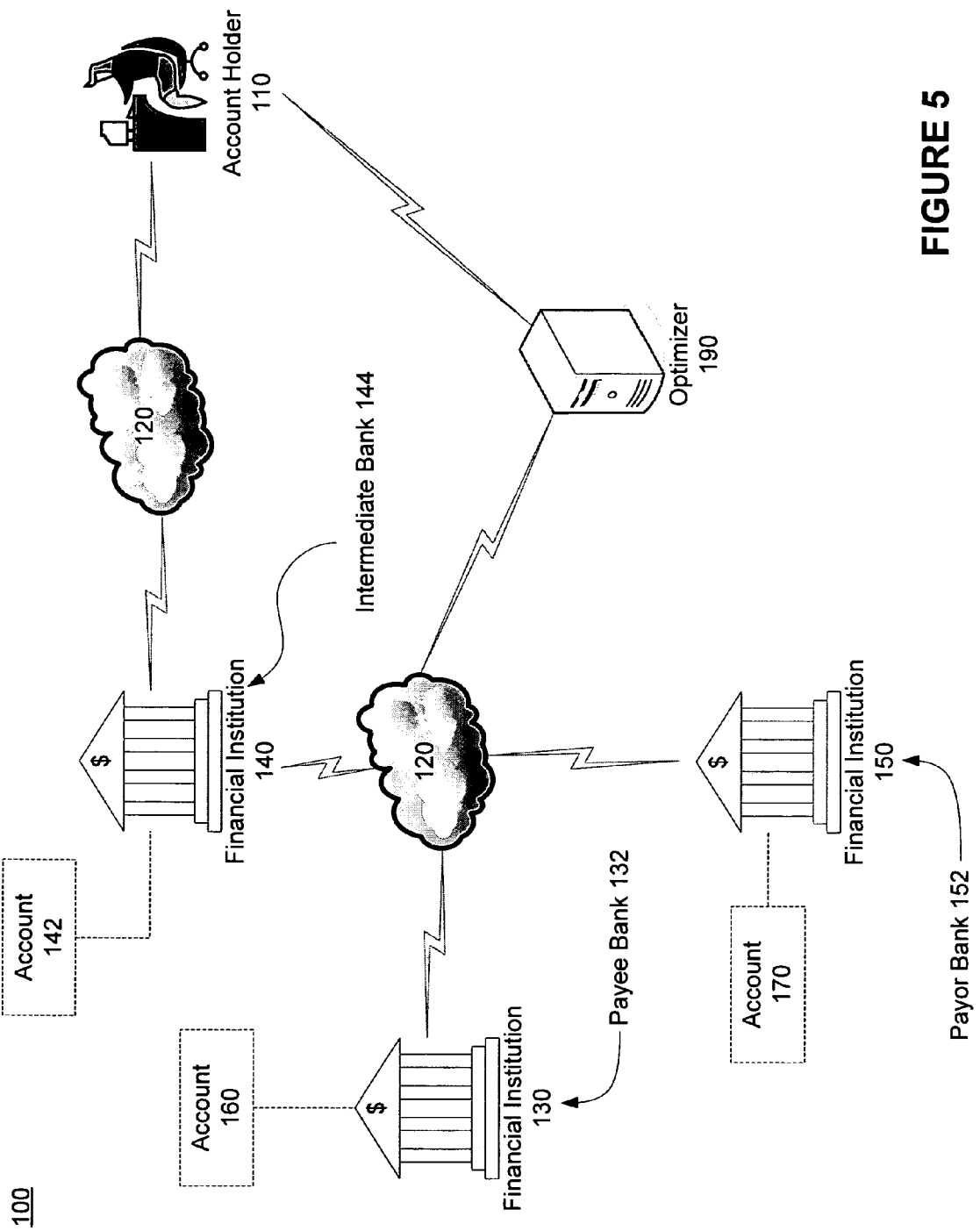
FIG. 5 illustrates account holders/payees directly depositing negotiable instruments with intermediate financial institutions.

In another aspect of the presently disclosed subject matter, FIG. 5 illustrates softcopy deposits of checks (or other negotiable instruments) that can be made to any intermediary financial institution. The term "intermediary" can include any bank or enterprise between a payee's bank and a payor's bank, such as the aforementioned branch of the Federal Reserve, whether regional or not, or another bank or enterprise that may transact as a go-between the payor's bank and the payee's bank. Thus, in FIG. 5, an account holder 110 can deposit a check via the communication network 120 to some intermediate bank 144. The deposited check may be in softcopy form and it may result in the credit of some account balances in the account holder's 110 account 160. Thus, this latter account 160 may be adjusted according to deposits made to the intermediate bank 144 account 142.

For example, if a deposit of $100 is made to the intermediate bank 144 account 142, this deposit may be credited to the account holder's 110 account 160. Furthermore, this $100 deposit may then debited from the payor's bank 152 account 170. Several mechanisms may be used to manage these accounts 142, 160, and 170, as was already discussed above. These mechanisms may be centralized or they may be distributed. Moreover, account management may be performed in real-time (dynamically), or it may be performed at some later time (for example, in a batching scenario).

In still another aspect of the presently disclosed subject matter, various mechanisms can be used to manage optimal depositing. Specifically, a computing optimizer can be used to determine which electronic deposit method will provide optimal results. Optimal results can be based on shortest transaction route, shortest time to process a transaction, and so on. Thus, for example, if the account holder 110 wants to deposit a check, the optimizer 190 can determine which transaction route might be the fastest. In some instances, depositing a check with the intermediate bank 142 might lead to the most efficient clearance of that check (or to quickest transfer of funds to a payee account 160). If the account holder 110 scans in a check and sends an electronic version of the check, before the check is actually sent, the optimizer 190 can analyze to which of the banks 130, 140, 150 this electronic version of the check should be forwarded.

It should be noted that even though the optimizer 190 is shown in FIG. 5 as residing remotely from the account holder 110, it can also reside on the account holder's computing device (i.e. it can reside on a client device). Intelligent software on the optimizer 190 can make a determination as to which bank the electronic version of the check should be routed. In some aspects, the user or some intelligent module can specify which banks are candidates for deposit and which are excluded. Thus, the account holder 110 can specify a plurality of intermediate and payor banks to which an electronic check image can be sent. And from there, the optimizer 190 selects the optimal route based on information it has gathered from the various banks 130, 140, and 150.

Figure 6:
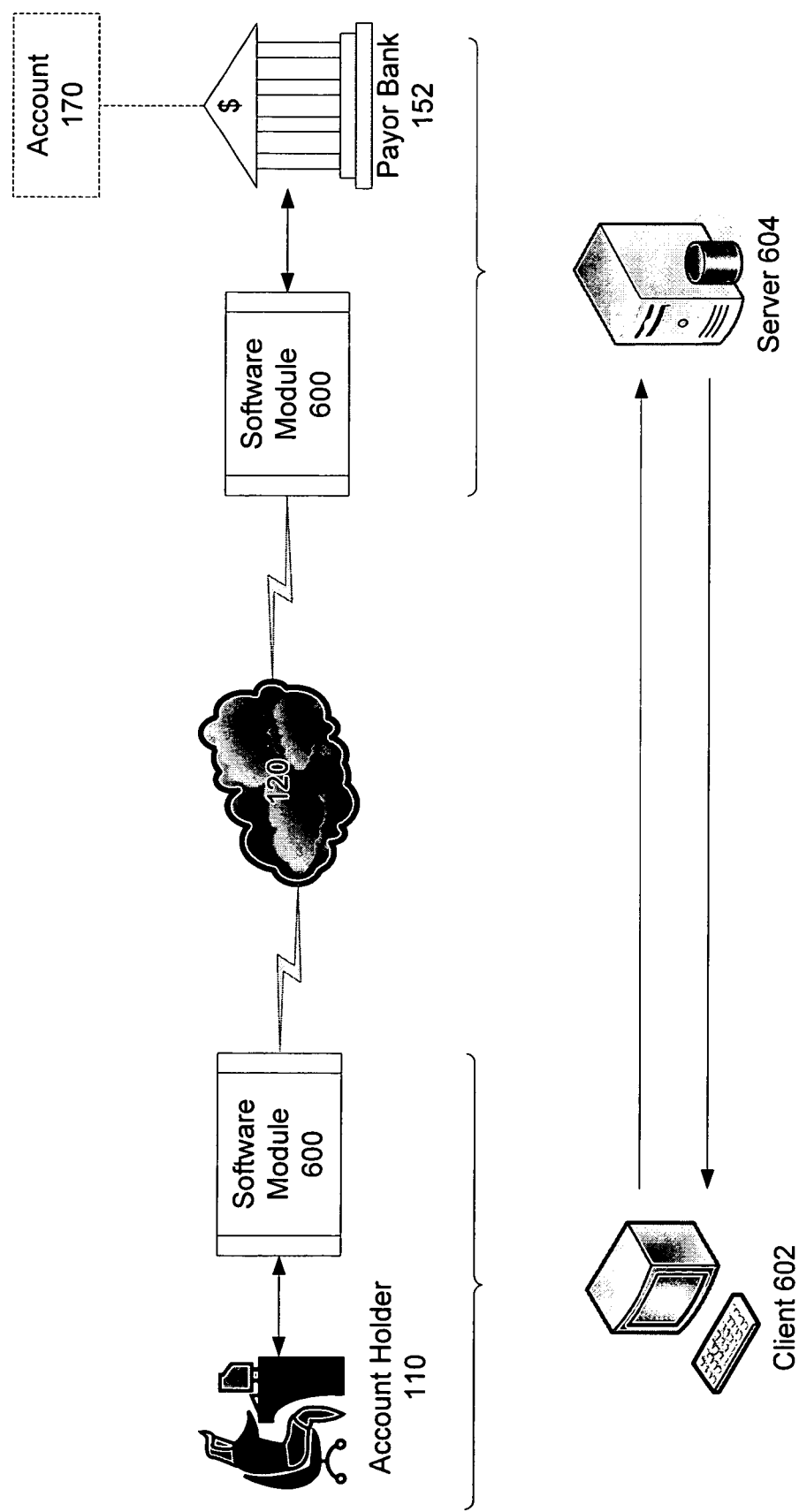
FIG. 6 illustrates software modules that can be used in aiding depositing with non-payee banks.

In another aspect of the presently disclosed subject matter, illustrated in FIG. 6, software modules can be used in aiding depositing in non-payee banks. For example, a software module 600 can be installed on the account holder's 100 computing device so that it can aid the account holder 110 in depositing a check in the payor's account 170. An account holder 110 may be able to access his own account, but may not be able to access or deposit a check to a payor's account 170. Thus, a software module 600 can be used so that a payor bank 152 will be able to receive and process any negotiable instrument that a payee, including the account holder 110, wants to deposit.

The software module 600 may be either on the client side 602 or the server side 604. For example, the presently disclosed subject matter contemplates the software module 600 being installed on the client side 602 (the account holder 110 side) so that a payor bank 152 can either pull or push whatever information it wants regarding a deposit or any other negotiable instrument transaction. Alternatively, the software module 600 may be installed on the server side 604 so that an account holder 110 on the client side 602 can access the payor bank 152 using any browsing software and simply deposit any negotiable instrument that may be drawn on the payor bank 152 or somehow associated with the payor bank 152.

Figure 7:
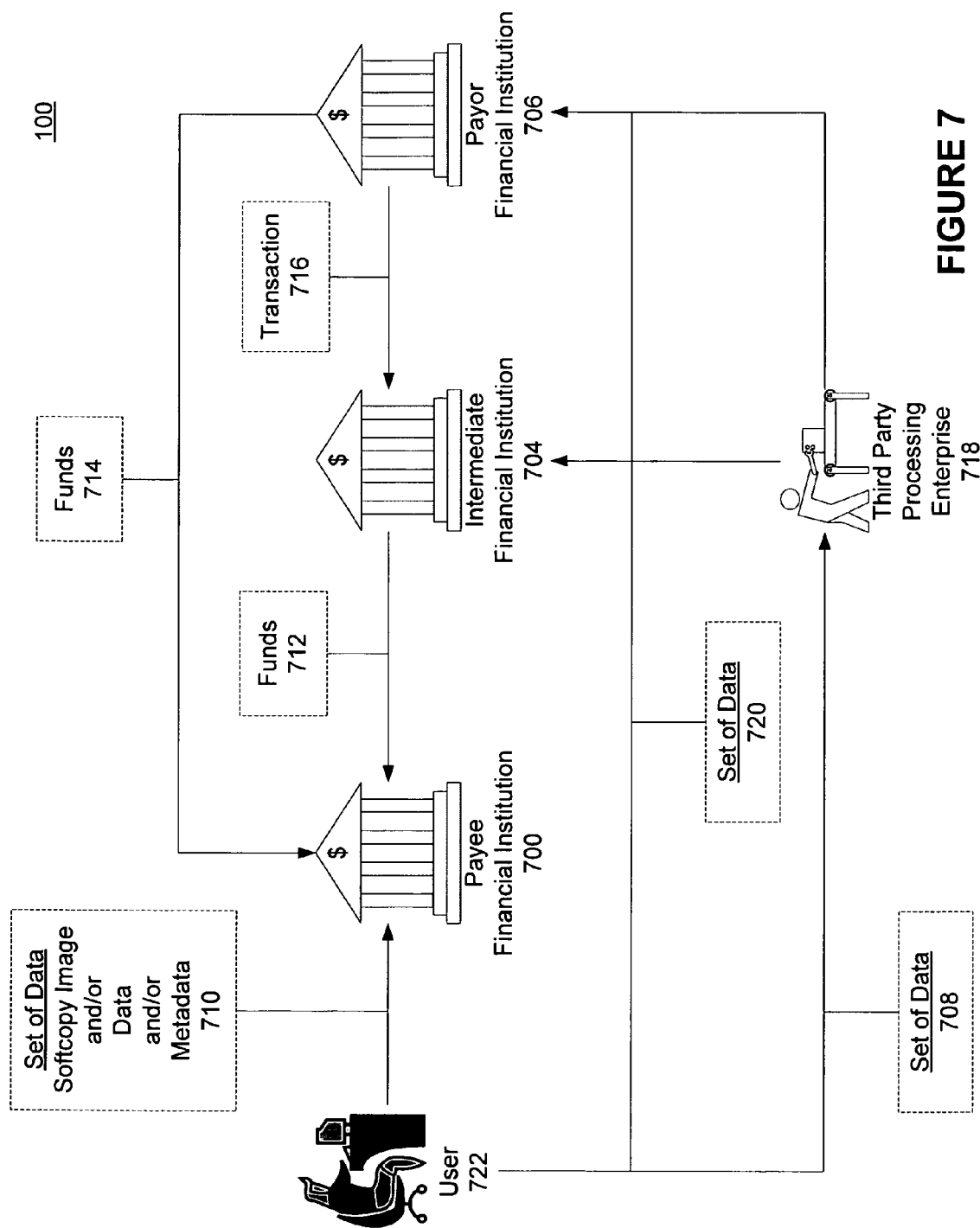
FIG. 7 illustrates how various types of information may be provided by a user to remotely deposit a check, including account holders/payees directly depositing negotiable instruments with third party enterprises.

In another aspect of the presently disclosed subject matter, FIG. 7 illustrates how various types of information may be provided by a user to remotely deposit a check. A user 722, who may be an account owner and/or a payee, can deposit a set of data, for example, softcopy images (e.g. a digital images) and/or data (e.g. MICR data) and/or metadata (which may be related to the digital image and/or MICR information and/or the user, e.g. name, address, account information, credit history, credit rating, etc.) to a financial institution. In other words, a subset of this set of data can be used. This financial institution, as discussed above, may be a payee institution 700, a payor institution 706, an intermediate institution 704 there-between, or some third party processing enterprise 718.

In one scenario, a set of data 710 may be submitted by the user 722 to a payee institution 700. This scenario has been described in some detail with reference to FIGS. 2A-3B (focusing, specifically, on submission of digital images; as will be shown below in a slightly different context, other data and metadata may also be submitted). The discussion with reference to FIGS. 2A-3B may also apply to other forms of submission. For example, the user 722 can submit a data set 720 directly to a payor financial institution 706. As mentioned, this kind of submission may obviate transaction costs inherent in other kinds of submissions. In the payor financial institution 706 submission, the payor financial institution 706 may receive a softcopy image of a check drawn on the payor financial institution 706. Additionally, or in the alternative, data such as MICR data may be submitted for faster processing, and metadata may be submitted to help in clearing a negotiable instrument and/or providing greater security. In any case, a confirmation can be sent back from the receiving party to the sending party that any subset of any set of data that was sent was in fact received.

If this submission is processed by the payer financial institution 706, some transaction 716 may be provided to the intermediate financial institution 704, which may in turn provide funds 712 to the pay financial institution 700. Alternatively, the payor financial institution 706 may provide funds 714 directly to the payee financial institution 700. These funds may be provided with a wire transfer, an ACH transaction, or some other electronic transaction (such as one used between payee banks and branches of the Federal Reserve).

Alternatively, the user 722 may also submit a data set 720 to an intermediate financial institution 704 directly. Similar logic may hold true for this scenario as for the subject matter discussed above, however, in this case the intermediate financial institution 704 would debit and credit the payor financial institution 706 and the payee institution 700, respectively, according to the appropriate amounts specified in the data set 720.

In yet another aspect of the present disclosure, a set of data 708 could be submitted to some third party processing enterprise 718 that would process the data set 708, and pass it to either the intermediate financial institution 704 or the payor institution 706 per the discussion above. For example, if the user 722 designated the payor financial institution 706 as the point of deposit, the third party processing enterprise 718 would provide the appropriate information to the payor financial institution 706.

The third party processing enterprise, could either receive a physical copy (or the original) or an electronic version of a negotiable instrument. This enterprise 718 could scan negotiable instruments, check digital images for compliance with Check 21 standards if such images are submitted to it, and so on. Upon such processing, it could forward the appropriate data (digital images and/or data and/or metadata) to the appropriate financial institution (704 and/or 706—even to 700).

Lastly, of the various sets of data 708, 710, 720, any combination of these sets 708, 710, 720 or even subsets thereof can be sent to various financial institutions either at least substantially simultaneously or at different times. For example, the user 722 or the user's 722 module on the user's 722 computing device, can send image data to the payor financial institution 706 and alpha-numeric MICR data to the payee financial institution 700 at the desired times. Thus, various combinations of sets and subsets can be sent to various institutions.

Figure 8:
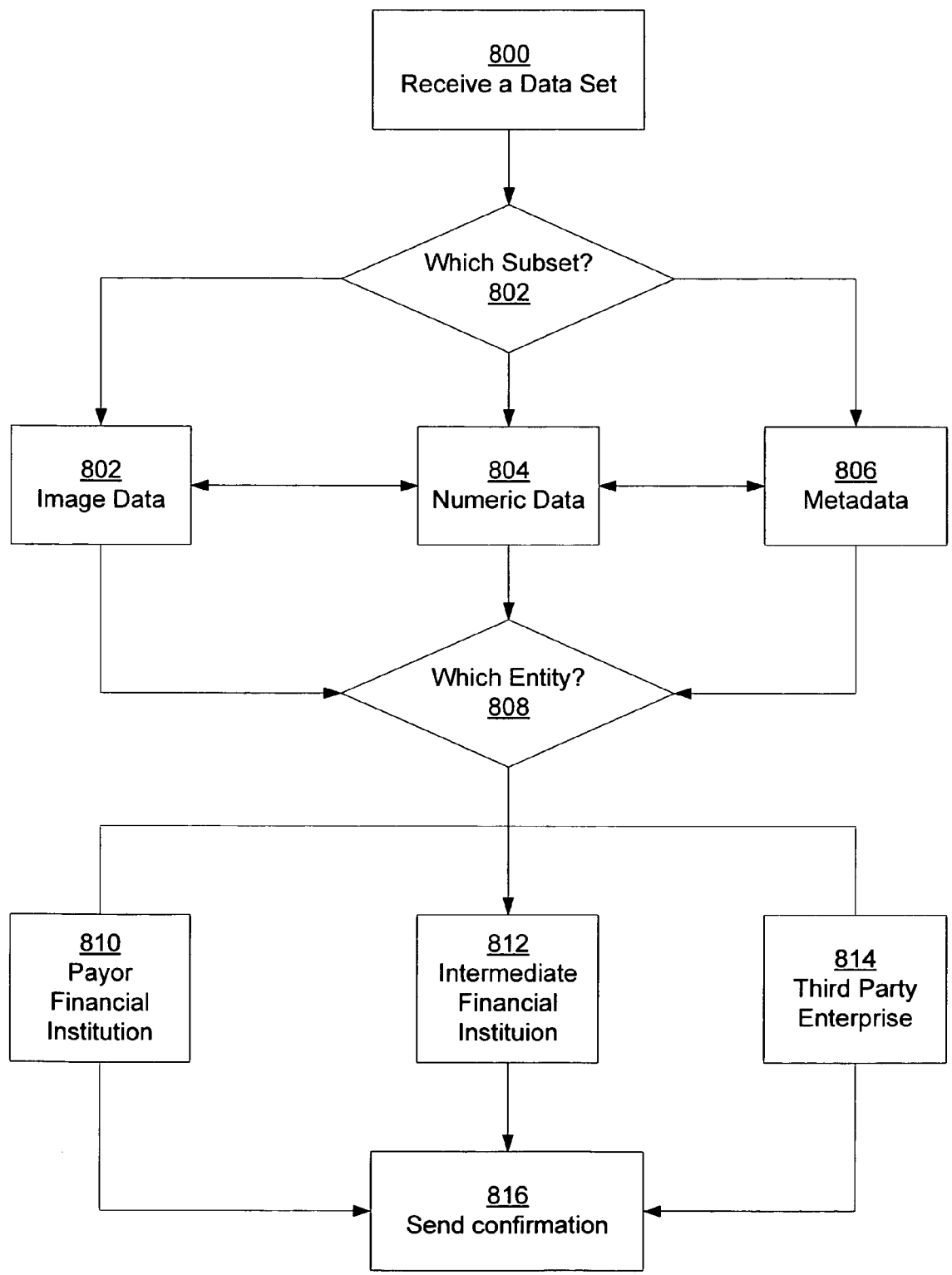
FIG. 8 illustrates a flow chart in block diagram form as to how users can submit negotiable instruments to non-payee financial institutions.

In still another aspect of the present disclosure, FIG. 8 illustrates a flow chart in block diagram form as to how users could submit negotiable instruments to non-payee financial institutions. At block 800, the step of receiving a set of data associated with negotiable instrument is performed. As suggested above, this set of data could be received from a scanner, a digital camera, a video capturing device, and the like. The set of data comprises at least one of image data of the negotiable instrument, alpha-numeric data associated with the negotiable instrument, and metadata associated with said at least one negotiable instrument.

Then, at block 802, a choice is made as to which subset of this data set should be selected for transmittal. At block 802 image data is a possibility; at block 804 alpha-numeric data is a possibility; and at block 806 metadata is a possibility. Since arrows connect all three blocks 802, 804, 806, all three of these subsets of the data set of block 800 could be chosen. Once the appropriate subsets are selected, the next question becomes which entity should they be sent to. There are a variety of non-payee entities available. For example, at block 810, a payor financial institution is a candidate; at block 812, an intermediate financial institution is another candidate; and finally, at block 814, a third party enterprise is also a candidate. The appropriate subsets and entities can be selected by a user of a system employing these elements (or alternatively some intelligent module). Lastly, once the appropriate subsets are sent, a confirmation of receipt and/or compliance can be sent from the receiving party of the data set back to the sending party (which may be a user on a computing device).

Clearing Negotiable Instruments without Using Digital Images

Figure 9:
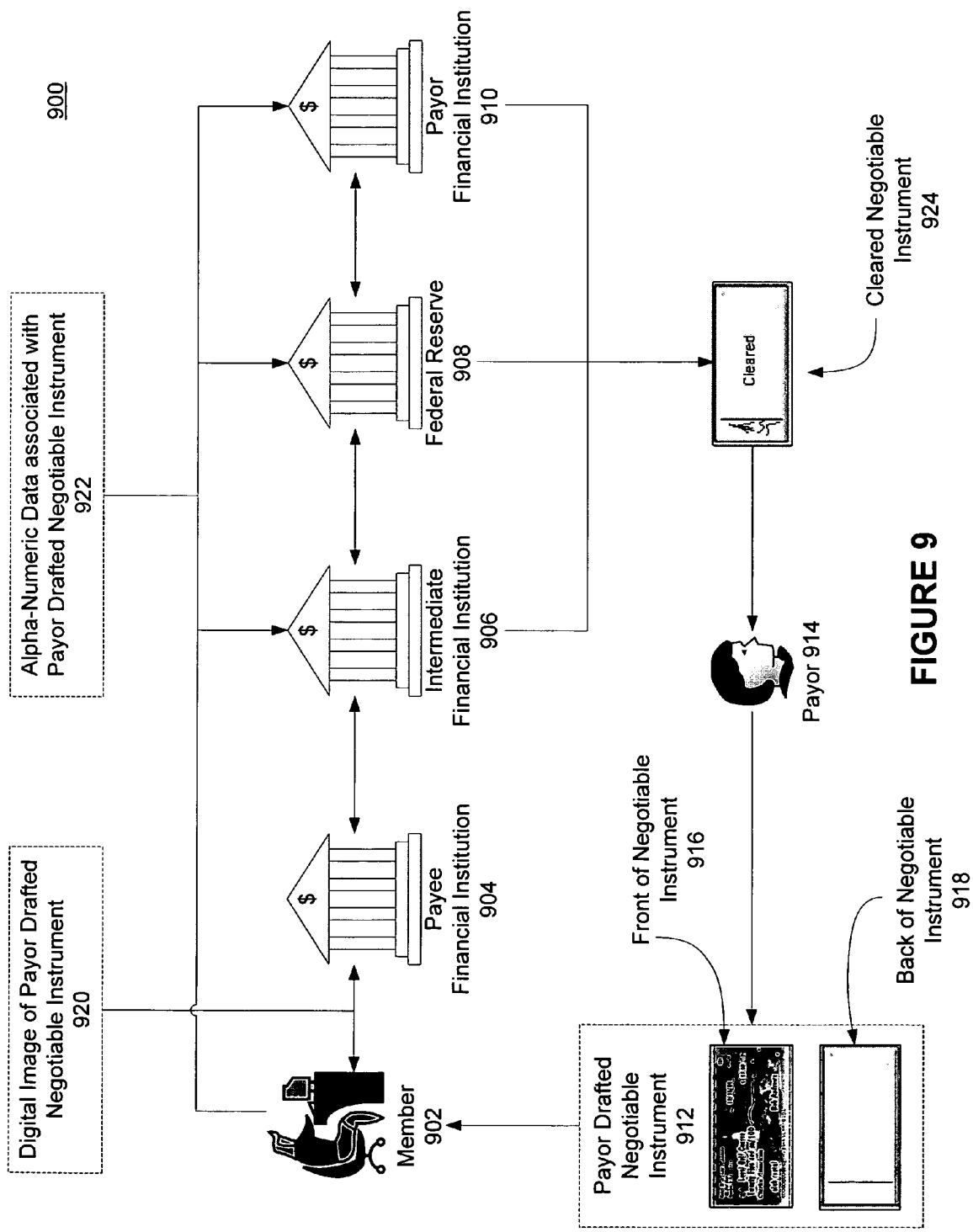
FIG. 9 illustrates the notion of clearing negotiable instruments using alpha-numeric transaction without needing to use digital images of negotiable instruments to do so.

In another aspect of the presently disclosed subject matter, as is illustrated in FIG. 9, negotiable instruments can be cleared without having to rely on digital images of such negotiable instruments. As was discussed above, Check 21 legislation allowed for the use of digital images of checks and reprints or substitute checks thereof. Thus, one way to clear checks, for example, is to receive a physical check or a digital image thereof and then clear the check based on such a digital image or a physical reprint of the digital image. However, FIG. 8 shows an alternative way to clear checks without having to rely on such digital images and substitute checks.

Specifically, instead of digital images alpha-numeric data can be sent to a check clearing financial institution. Per FIG. 9, a payor 914 can draft a negotiable instrument 912, where the negotiable instrument 912 has a front side 916 with MICR data, payee name, date, amount, signature, and so on, and a back side 918 configured for endorsement by the payee. Once the payor 914 drafts the negotiable instrument 912, it can be sent or given to a member 902 of some payee financial institution 904. Upon receipt, the member 902 can transform this check 912 into electronic form. Software on the member's 902 computing device can receive any check information in electronic form and send it to a desired financial institution.

Again, focusing on the specifics, a digital image 920 of the payor drafted negotiable instrument can be submitted by some software module to the payee financial institution 904. And in addition, alpha-numeric data 922 that is associated with the payor drafted negotiable instrument can be sent to a financial institution that will clear the negotiable instrument in question. The alpha-numeric data may include (but is not limited to) MICR information, ACH related information, debit or credit related information, wire transfer information, virtual check-like information (where this information acts as if it's a virtual check, including the already mentioned date, signature, amount, payee name, "for" information, and so on).

As can be seen, there are a plurality of such financial institutions to choose form for providing such alpha-numeric information: a payor financial institution 910, some institution intermediate 906 to the payee financial institution 904 and the payor financial institution 910, some branch of the Federal Reserve 908, and so on. Once this alpha-numeric information is provided to any one (or some combination) of the shown financial institutions 906, 908, 910, the payor drafted negotiable instrument can be cleared 924. It should also be noted, that the payee financial institution 904, in some cases, can also clear negotiable instruments internally. For example, if a negotiable instrument is associated with the same financial institution for both a payor and a payee—which is not too difficult to image, given the size of some financial institutions, such as Chase, Bank of America, Wells Fargo, and so on—such a negotiation instrument can be cleared internally. In this scenario, perhaps only the digital image will suffice for clearing a check, however, additionally (or in the alternative) the aforementioned alpha-numeric data can also be presented to speed up check clearance.

In another aspect of the present disclosure, digital images can be sent to some financial institutions but other related data, such as alpha-numeric data, can be sent to still other financial institutions. Exactly how and where digital images and any associated alpha-numeric data are sent may depend on a variety of factors. For example, the member 902 may designate that checks should be cleared using alpha-numeric data only with payor financial institutions. Alternatively, some software module may make a determination as to which financial institution would provide the fastest, from a temporal point of view, or most transaction efficient, from a numeric transaction point of view, clearance of a negotiable instrument. Such software modules were already mentioned with reference to FIG. 6, but other computing devices and/or modules are contemplated per the discussion with reference to FIG. 15.

It is understood that the present disclosure should be understood in its entire context and that other data can be used in assisting with clearance of negotiable instruments. For example, metadata associated with a negotiable instrument (e.g. a check) was discussed above and with reference to FIG. 7. Such metadata may provide additional data to the digital images 920 and alpha-numeric data 922 shown in FIG. 9, even if it is in a format different from these two types of data.

In any event, one advantage of the present system 900 is that it obviates with the sending of digital images among numerous financial institutions. Instead, the digital image 920 can be sent to one final destination financial institution (shown as the payee financial institution 904, but it could just as easily have been any of the other ones 906, 908, 910) and the alpha-numeric data 922 can be used to execute any remainder of the transaction. The digital image need not be passed among financial institutions, but it may be provided upon request.

Once a transaction involving digital images 920 and alpha-numeric data 922 is completed (or nearly completed), verification can be sent to the member 902 that the negotiable instrument has cleared and that funds have been adjusted accordingly. Alternatively, if some problem has occurred along the way, the digital images 920 and alpha-numeric data 922 can be resent. In one aspect, they can be resent along the same transaction route; in another aspect, they can be resent along a different transaction route. And, moreover, various attempts may be made in the sending and receiving aspect associated with this data 920, 922.

In another aspect of the present disclosure, the separation of digital images 920 from alpha-numeric data 922 can also involve non-financial institutions. Such non-financial institutions may be merely digital image processing enterprises or some other negotiable instrument processing enterprises that are not involved in, for example, the banking industry, and are thus not subject to its regulations and limitations.

Figure 10:
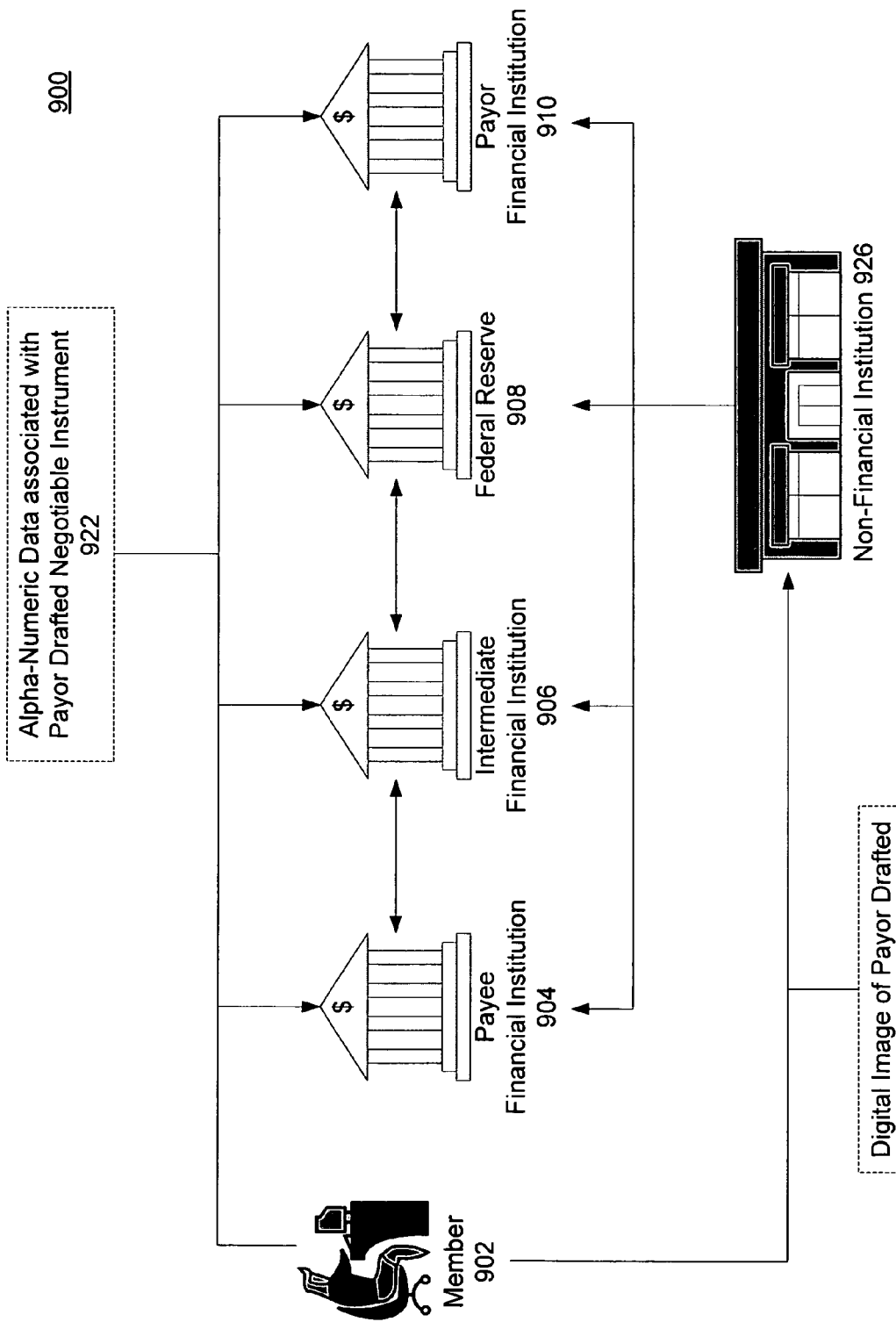
FIG. 10 illustrates a further aspect discussed with reference to FIG. 9, namely, the use of non-financial institutions in the negotiable instrument clearing process.

For example, FIG. 10 illustrates that a non-financial institution 926 can receive digital images 920 from the member 902. Alternatively, the member 902 can mail a physical copy or the actual original of a negotiable instrument to the non-financial institution 926. This non-financial institution 926 can receive digital images 920 and process them according to any instructions (whether from some financial institution 904, 906, 908 or the member 902). If any of the illustrated financial institutions ever want to access the digital image 920, they can request it from the non-financial institution 926. Alternatively, the financial institution 926 can automatically provide the digital image 920 to the appropriate financial institution (e.g. the clearing financial institution).

Since the digital image 920 can be stored or warehoused in the non-financial institution 926, the negotiable instrument in question can be actually cleared using the above mentioned alpha-numeric data 922. As can be seen in FIG. 9, this alpha-numeric data can be provided to whatever financial institution 904, 906, 908, 910 is responsible for clearing the negotiable instrument. For instance, the payor financial institution 910 can receive the alpha-numeric data 922 for clearance purposes as a debit, credit, ACH, wire transfer, or virtual check transaction. As those of skill in the art will readily appreciate, various other types of non-digital image based transaction can be involved.

Figure 11:
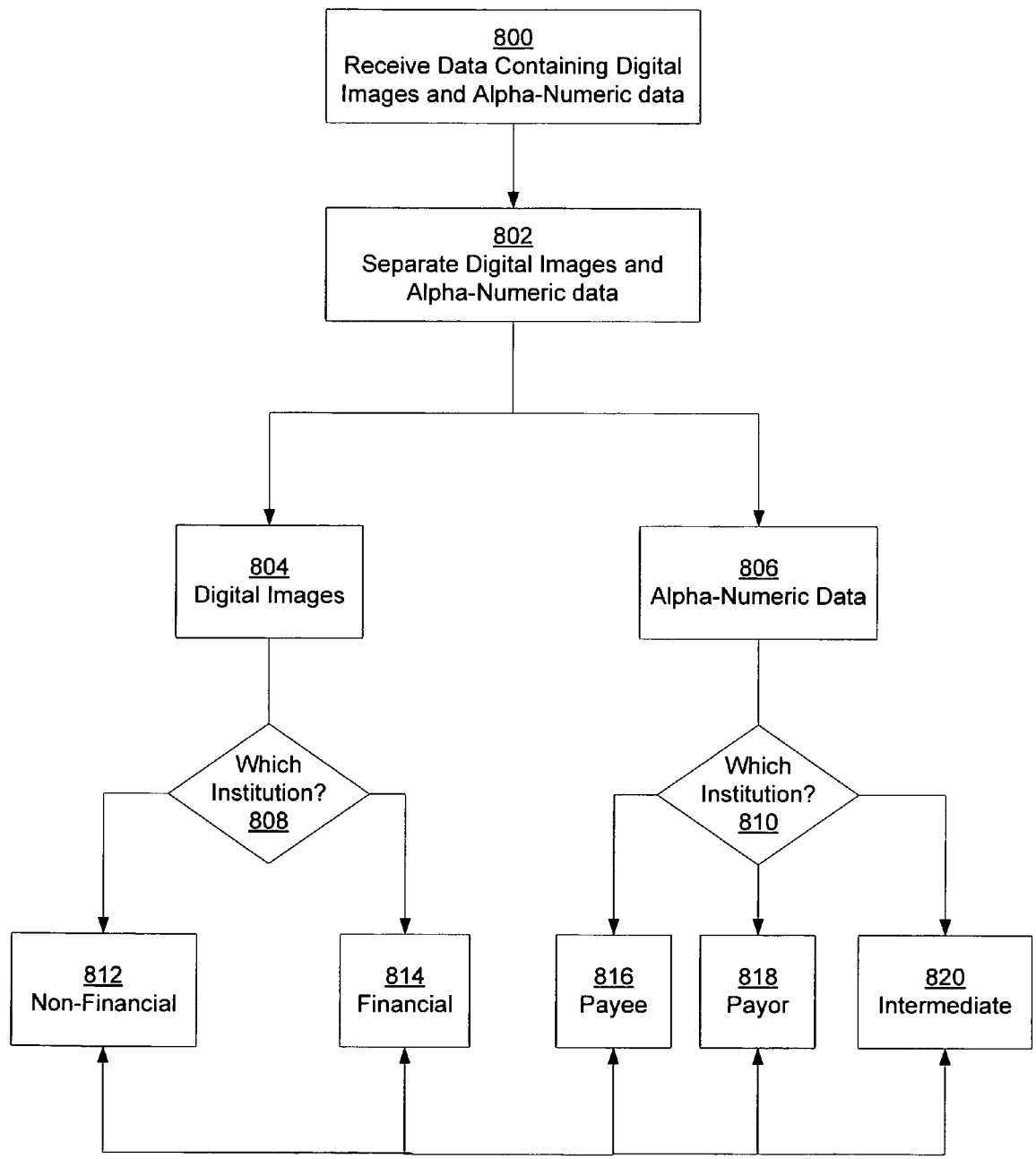
FIG. 11 illustrates a flow chart in block diagram form depicting ways to clear negotiable instruments without using digital images.

In another aspect of the presently disclosed subject matter, FIG. 11 illustrates a flow chart in block diagram form that depicts how negotiable instruments can be cleared without using digital images. At block 800, a bundle or set of data containing digital images and alpha-numeric data is received. It should be noted, that in some aspects, the alpha-numeric data may be derived from a digital image, or at least both kinds of data can be derived using the same device—for example, some kind of scanning device. In any case, once the total data is received, at block 802, it can be separated (if it wasn't already separated) into digital image data and alpha-numeric data.

Once this is accomplished, at blocks 804 and 806, containing separated digital images and alpha-numeric data, respectively, the next step is to determine which institution the separated data should be forwarded to. In the case of the digital images, at block 804, this determination, is made at block 808. Thus, digital images 804 can be sent to non-financial institutions, as is shown at block 812, or to financial institutions 814. In the former case, digital images can be sent to some processing plant and/or storage enterprise that maintains physical checks and/or images of such checks and/or substitute versions of such checks. In the latter case, digital images are sent to such financial institutions as payor banks, payee banks, intermediate banks (with may include branches of the Federal Reserve). It should be noted that such financial institutions, at blocks 816, 818, and 820 may request digital images from either the non-financial institutions, at block 812, or financial institutions, at block 814.

Turning now back to block 806, a determination also has to be made regarding alpha-numeric data, at block 810. Should the alpha-numeric data, at block 806, be provided to a payee financial institution, at block 816, a payor financial institution, at block 818, or an intermediate financial institution, at block 820? This determination, as already discussed above, may be made based on various policies and/or rules. For example, for clearing a negotiable instrument purposes, alpha-numeric data may be provided directly to a payor bank so that it can be cleared quickly. Alternatively, where the Federal Reserve in involved, perhaps such alpha-numeric data would be provided to an intermediate institution. If the negotiable instrument can be cleared internally, perhaps it might be provided to the payee financial institution. Furthermore, either computing device users (e.g. members) or software associated with such users and/or financial institutions can make a determination as to which financial institution should receive alpha-numeric data for clearing a negotiable instrument associated with such data.

Displaying Negotiable Instruments Derived from Various Sources

In another aspect of the presently disclosed subject matter, negotiable instruments derived from various sources can be displayed for a member 1202 of an institution, such as a member institution 1210. This institution 1210 may be a financial institution, such as a bank, or a non-financial institution, such as an insurance enterprise with some banking aspects, or just about any kind of business dealing with some financial transactions. For example, a member 1202, who may be an owner of an account at the member institution 1210, can write out a check 1204 to some payee 1210. The payee 1210 can then deposit this check 1204 to some payee institution 1212. The payee institution 1212, in turn, can present this check 1204 to the member institution and then this check can be cleared.

Once the member institution 1210 receives this check, it can post a digital image of the check 1204' for the member 1202 to see and examine. It should be noted, that the payee financial institution 1212 can either send the original check 1204 to the member institution 1210, a copy of the original check, a digital image of the original, or may conduct this transaction using alpha-numeric data (per the discussed above, in which case either the original, copy thereof, or the digital image might be provided to the member institution 1210). In any case, once the member institution 1210 receives the check 1204, whether in hardcopy or softcopy form, the member institution 1210 can load the member drafted check image 1204' onto a server for the client member 1202 to access via some communication network.

Figure 12:
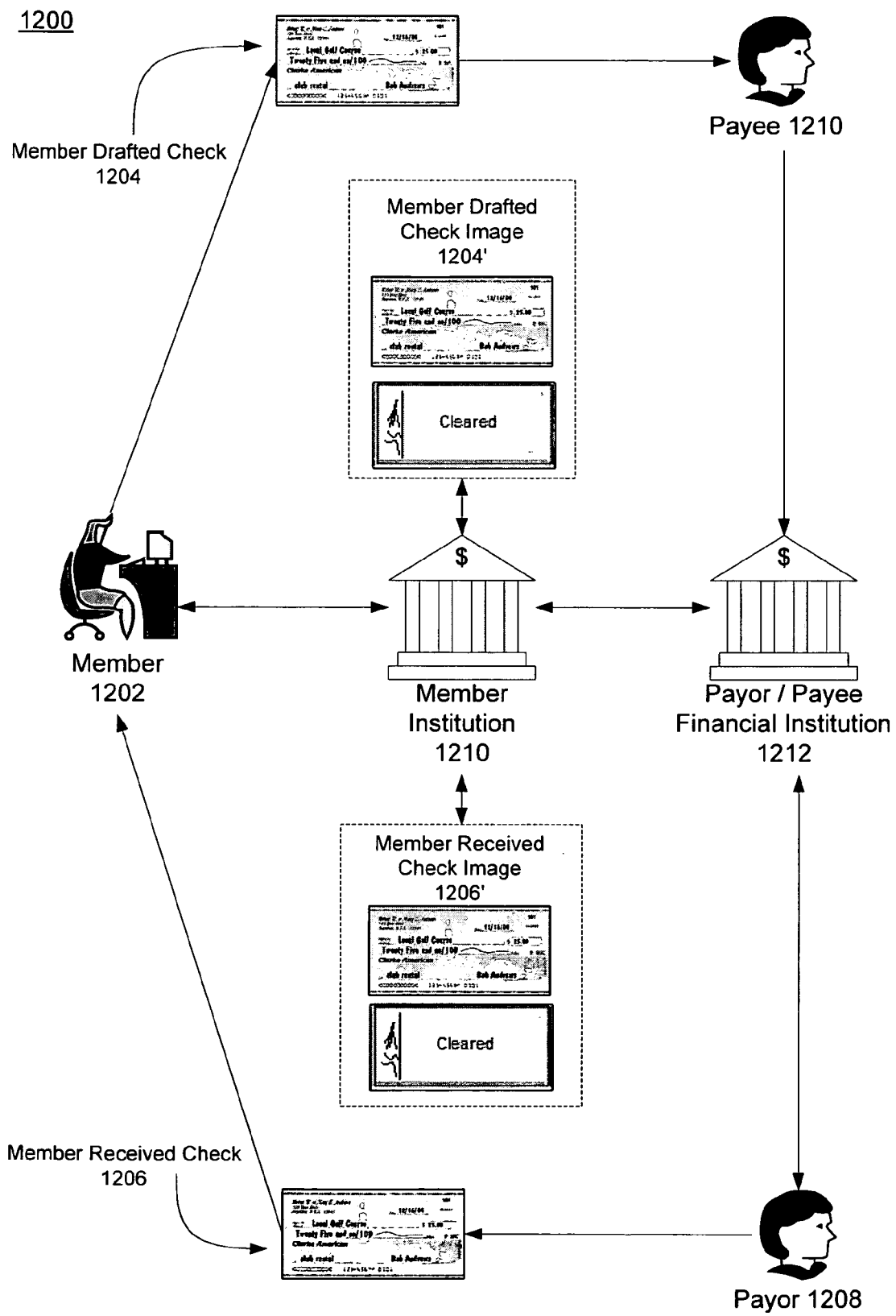
FIG. 12 illustrates how a member of an institution can access digital images of displayed negotiable instruments derived by the member from various sources.
Figure 13:
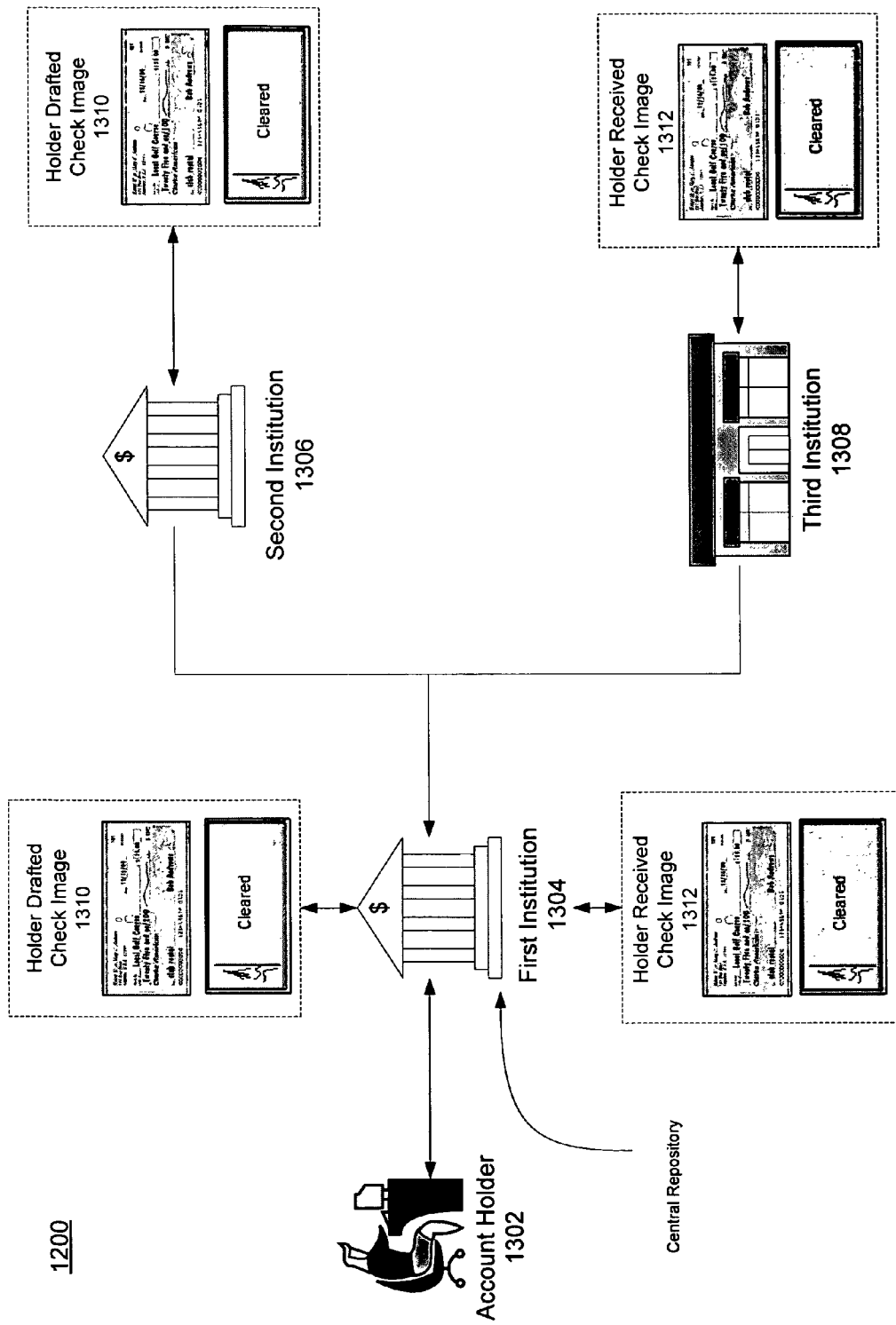
FIG. 13 illustrates the synchronization across various institutions of the displayed digital images depicted in FIG. 13.

Additionally, not only is the member 1202 able to see member drafted check images 1204' but also any checks that the member received from payors. For example, a payor 1208 can provide to a member 1202 a check 1206. Upon receipt, the member 1202 can scan in the check 1206 and provide it to his or her member institution 1210 in the form of a digital image 1206 in the accordance with the various aspects discussed above. Alternatively, the member 1202 can mail either the original check 1206 or a hardcopy thereof to the member institution 1210, and the member institution 1210 can generate a digital image of the check 1206. Additionally, the member institution 1210 can place a "void" marker on check 1206 once this check has cleared or if a digital image of the check 1206 has already been provided by the member 1202. In any case, the member institution 1210 can then save this digital image 1206' and store it on some computing device, such as a server, so that the member 1202 can access this digital image 1206' via some communication network. Thus, in this way, the system 1200 depicted in FIG. 12 allows a member 1202 to access digital images of negotiable instruments, such as checks, from various sources, whether the source is the member 1202 drafting a check or whether the source is a payor 1208 providing a check for the member 1202.

Thus, in summary, individual A can deposit a negotiable instrument in institution A (or alternatively, a negotiable instrument can be drawn on institution A by individual A', where the negotiable instrument is made out by individual A), and individual B can deposit a negotiable instrument in institution B (or alternatively, a negotiable instrument can be drawn on institution B by individual B', where the negotiable instrument is made out by individual B). In any case, digital images of negotiable instruments can display at institution A, institution B, and/or some other target institution (although, in some cases, the target institution may correspond to institution A and/or institution B). Hence, digital images originating from various sources and/or institutions can be examined by individuals. If, for example, individual A holds accounts in institutions A and B, that individual may examine digital images of negotiable instruments stored at both institutions, even though such institutions may be separate and distinct enterprises (e.g. Bank of America and Chase Manhattan Bank).

A user could view both a first digital image and a second digital image, if such a user holds an account with at least one of the institutions storing the first and second digital image—even though the respective first institution may be a distinct enterprise (e.g. Bank of America) from a second institution (Chase Manhattan Bank). Put in other words, at least one of two architectures are envisions herein: (1) a system where a user can view multiple accounts at once to view all images of negotiable instruments related to that user, and (2) a system where the user can view one account that has been synchronized with other multiple accounts. In the former case, a software module or program can allow a user using a client computer to connect to servers at institutions and log-in to view the respective accounts; and moreover, the program can aggregate all the digital images of negotiable instruments in one space, such as a web page, so the user can view the entire universe of his or her digital images of negotiable instruments. In the latter case, however, the user can merely log on to one existing account related to some institution, and then digital images can by synchronized from other institutions to that institution so the user may view all digital images related to that user. Those of skill in the art would readily appreciate that APIs and other standard programming functionalities could be used to accomplish this goal.

In another aspect of the presently disclosed subject matter, an account holder 1302 may have various accounts across various institutions. For example, the account holder 1302 can have a traditional banking account that the holder 1302 uses daily, an additional banking account used for other purposes, a credit card account, a line of credit account, commercial transaction account, such as a PayPal account, and so on. The account holder 1302, may want to access digital images of checks the account holder 1302 drafted or received at other institutions 1306, 1308. To have such a one-stop digital image warehouse, digital images 1310, 1312 can be synchronized from various other accounts at other institutions 1306, 1308 that the account holder 1302 may be affiliated with.

For example, the account holder 1302 may have an account at a second institution 1306, which may be a line of credit account. Any checks the account holder 1302 drafts against this account, may have corresponding digital images 1310. However, unless the account holder 1302 access this account at the second institution 1306, he may not be aware that such a digital image 1310 exists. Alternatively, it may be burdensome for the account holder 1302 to have to access a plurality of accounts at different institutions in order identify a negotiable instrument of interest to the account holder 1302. Thus, in one aspect of the presently disclosed subject matter, the digital image 1310 at the second institution 1306 is sent to the first institution 1304. Whether such a digital image 1310 is pushed by the second institution 1306 or pulled by the first institution 1304 is an implementation detail that depends on the architecture of the present system 1200. Once the digital image 1310 is received by the first institution 1304, the account holder 1302 can access this digital image 1310 and display it.

In another aspect of the present disclosure, the account holder 1302 can also receive various negotiable instruments that may be deposited at a third institution 1308, which may be some business enterprise, such as the account holder's 1302 workplace. If the workplace has a digital image 1312 of the account holder's check, this digital image 1312 can also be provided to the first institution 1304, and stored at the first institution 1304 so that the account holder 1302 can later access and display this digital image 1312. It should be noted that synchronization of such digital images 1310, 1312 can be performed at specified times, daily, weekly, monthly, and so on. It can also be accomplished on a check-by-check basis or in batches. Those skilled in the art will appreciate the various synchronization mechanisms that could be used with various aspect disclosed herein.

Figure 14:
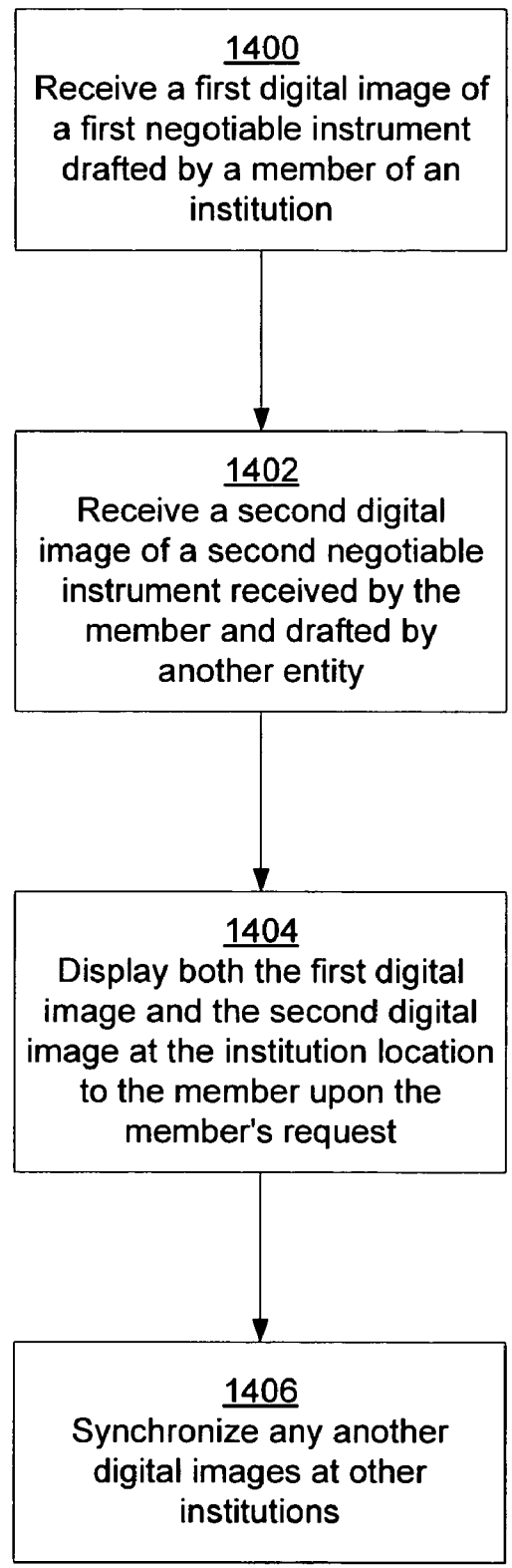
FIG. 14 illustrates a flow chart in block diagram form depicting ways to display negotiable instruments emanating from various sources.

Lastly, a block flow chart is shown in FIG. 14, describing various aspects of displaying digital images derived from various sources. At block 1400, a first digital image of a first negotiable instrument is received, where the instrument was drafted by a member of an institution. At block 1402, a second digital image of a second negotiable instrument is received, where this instrument was drafted by another entity, whether by another person or an inanimate object. At block 1404, both the first digital image and the second digital image are displayed at the institution location to the member upon the member's request. And finally, at block 1406, any other digital images at other institutions are provided to the institution via synchronization (which may be a two-way synchronization). These steps outline the general notion of this aspect of the present disclosure and are meant to be exemplary and not limiting.

Exemplary Computing and Networking Environment

Figure 15:
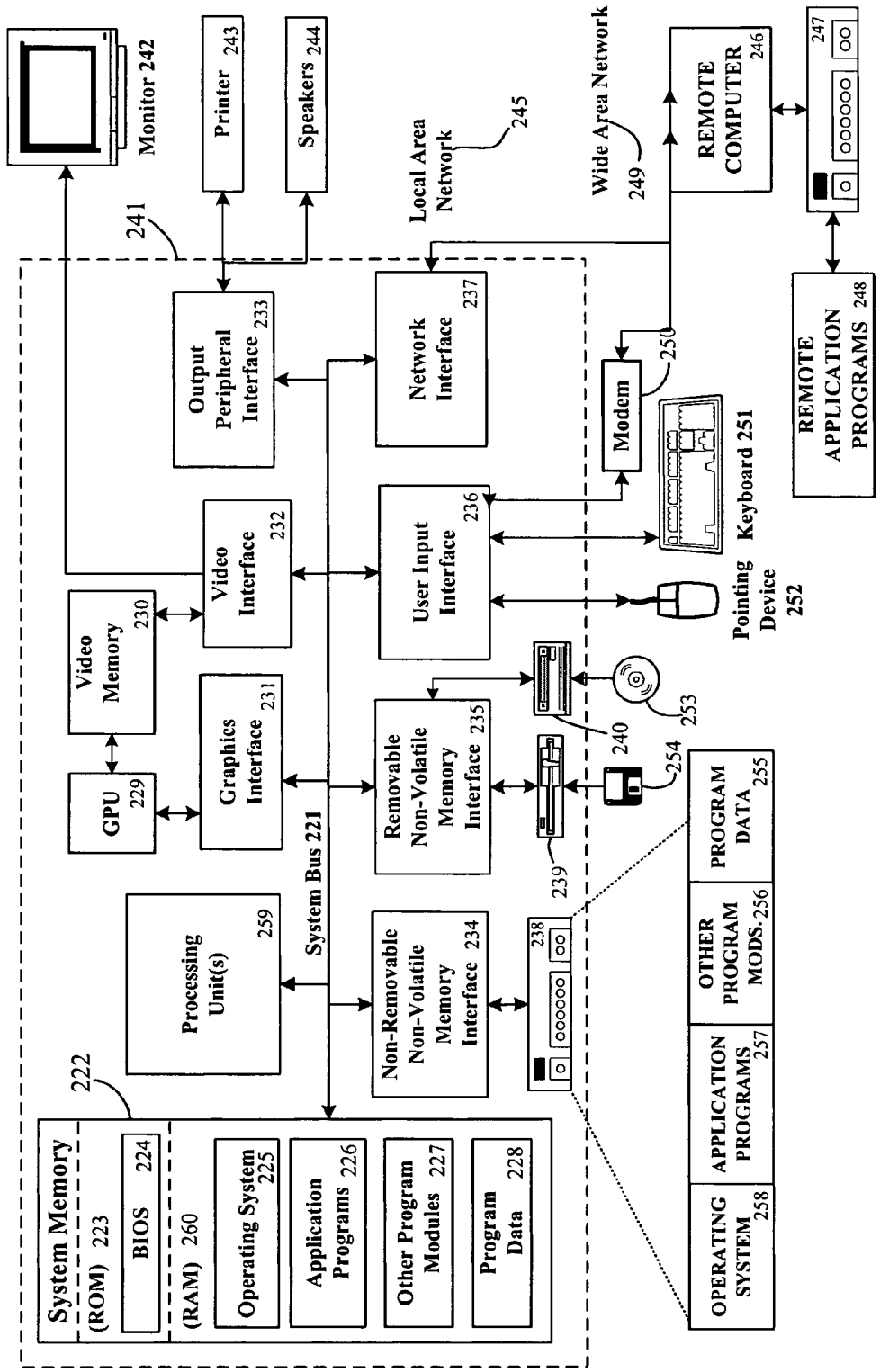
FIG. 15 illustrates a block diagram representing an exemplary computing device suitable for use in conjunction with the aforementioned aspects.

Referring to FIG. 15, shown is a block diagram representing an exemplary computing device suitable for use in conjunction with implementing the systems and methods described above. For example, computer executable instructions that carry out the processes and methods for (1) remotely depositing negotiable instruments to non-payee financial institutions, (2) clearing negotiable instruments without using digital images, and (3) displaying negotiable instruments from various sources are provided. They may reside and/or be executed in such a computing environment as shown in FIG. 15. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. For example a computer game console may also include those items such as those described below for use in conjunction with implementing the processes described above.

Aspects of the presently disclosed subject matter are operational with numerous other general purpose or special purpose computing system environments or configurations. Examples of well known computing systems, environments, and/or configurations that may be suitable for use with the this subject matter include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the presently disclosed subject matter may be implemented in the general context of computer-executable instructions, such as program modules, being executed by a computer. Generally, program modules include routines, programs, objects, components, data structures, etc. that perform particular tasks or implement particular abstract data types. Aspects of the presently disclosed subject matter may also be practiced in distributed computing environments where tasks are performed by remote processing devices that are linked through a communications network. In a distributed computing environment, program modules may be located in both local and remote computer storage media including memory storage devices.

An exemplary system for implementing aspects of the presently disclosed subject matter includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 15 illustrates operating system 225, application programs 226, other program modules 227, and program data 228.

The computer 241 may also include other removable/non-removable, volatile/nonvolatile computer storage media. By way of example only, FIG. 15 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 15, provide storage of computer readable instructions, data structures, program modules and other data for the computer 241. In FIG. 15, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 15. The logical connections depicted in FIG. 15 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 15 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the said subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 15, the systems and methods provided herein cannot be construed as limited in any way to a particular computing architecture. Instead, the presently disclosed subject matter should not be limited to any single embodiment, but rather should be construed in breadth and scope in accordance with the appended claims.

Figure 16:
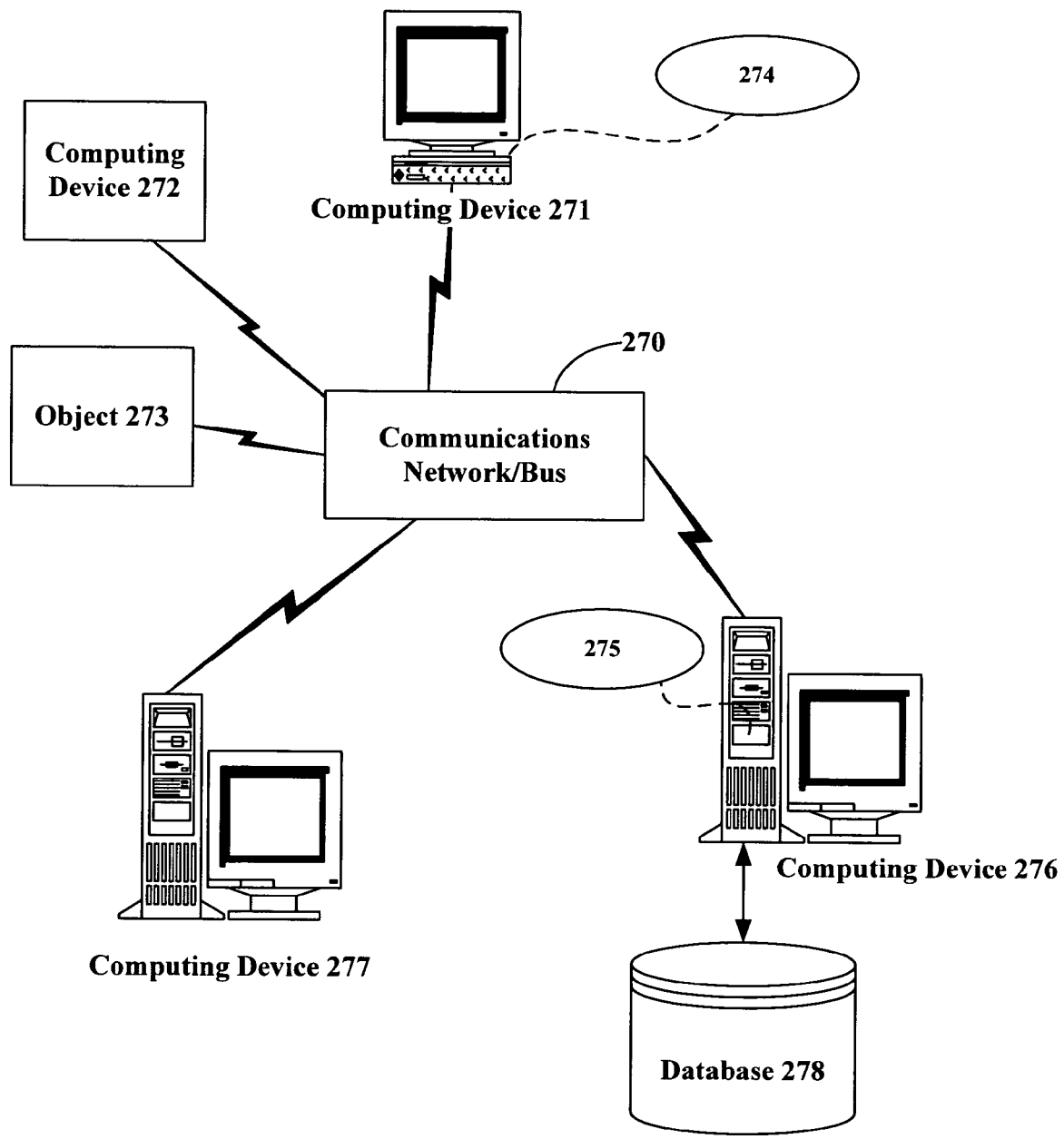
FIG. 16 illustrates an exemplary networked computing environment in which many computerized processes may be implemented to perform the aforementioned aspects.

Referring next to FIG. 16, shown is an exemplary networked computing environment in which many computerized processes may be implemented to perform the processes described above. For example, parallel computing may be part of such a networked environment with various clients on the network of FIG. 16 using and/or implementing the defining and extracting of a flat list of search properties from a rich structured type. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 16 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 16, and may itself represent multiple interconnected networks. In accordance with an aspect of the presently disclosed subject matter, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 16, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 16 and the further diversification that can occur in computing in a network environment such as that of FIG. 16, the systems and methods provided herein cannot be construed as limited in any way to a particular computing architecture or operating system. Instead, the presently disclosed subject matter should not be limited to any single embodiment, but rather should be construed in breadth and scope in accordance with the appended claims.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, processes and methods were described at least for remote deposit of negotiable instruments to non-payee financial institutions, for clearing negotiable instruments without digital images, and for displaying negotiable instruments from various sources. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A system for displaying digital images of negotiable instruments derived from a plurality of sources, comprising:
    a first subsystem configured to store a first digital image of a first negotiable instrument at a first institution, wherein said negotiable instrument is deposited at said first institution;
    a second subsystem configured to store a second digital image of a second negotiable instrument at a second institution, wherein said negotiable instrument is deposited at said second institution;
    a third subsystem configured to synchronize said first digital image with said second digital image at said second institution, wherein said first digital image and said second digital image are synchronized dynamically on digital image by digital image basis; and
    a fourth subsystem configured to view both said first digital image and said second digital image by accessing said second institution.

2. The system according to claim 1, wherein at least one of said first digital image and said second digital image is created by from at least one of (a) a negotiable instrument, (b) a hardcopy of said negotiable instrument, (c) a different digital image, and (d) data related to said negotiable instrument.

3. The system according to claim 1, wherein at least one of said first digital image and said second digital image is provided by an entity in a form to be displayed by said second institution.

4. The system according to claim 1, wherein said synchronization is performed by a software module located at said second institution.

5. The system according to claim 1, wherein said first digital image and said second digital image are synchronized on a batch basis.

6. The system according to claim 1, wherein a verification of receipt of said first digital image is provided by said second institution.

7. method for displaying digital images of negotiable instruments derived from a plurality of sources, comprising:
   storing a first digital image of a first negotiable instrument at a first institution, wherein said negotiable instrument is deposited at said first institution;
   storing a second digital image of a second negotiable instrument at a second institution, wherein said negotiable instrument is deposited at said second institution;
   synchronizing said first digital image with said second digital image at said second institution, wherein said first digital image and said second digital image are synchronized dynamically on digital image by digital image basis; and
   viewing both said first digital image and said second digital image by accessing said second institution.

8. The method according to claim 7, further comprising creating at least one of said first digital image and said second digital image from at least one of (a) a negotiable instrument, (b) a hardcopy of said negotiable instrument, (c) a different digital image, and (d) data related to said negotiable instrument.

9. The method according to claim 7, further comprising providing at least one of said first digital image and said second digital image by an entity in a form to be displayed by said second institution.

10. The method according to claim 7, further comprising synchronizing with a software module located at said second institution.

11. The method according to claim 7, further comprising synchronizing on a batch basis said first digital image and said second digital image.

12. The method according to claim 7, further comprising providing a verification of receipt of said first digital image by said second institution.

13. A computer readable medium bearing computer executable instructions for displaying digital images of negotiable instruments derived from a plurality of sources, comprising:
   storing a first digital image of a first negotiable instrument at a first institution, wherein said negotiable instrument is deposited at said first institution;
   storing a second digital image of a second negotiable instrument at a second institution, wherein said negotiable instrument is deposited at said second institution;
   synchronizing said first digital image with said second digital image at said second institution, wherein said first digital image and said second digital image are synchronized dynamically on digital image by digital image basis; and
   viewing both said first digital image and said second digital image by accessing said second institution.

14. The computer readable medium according to claim 13, further comprising creating at least one of said first digital image and said second digital image from at least one of (a) a negotiable instrument, (b) a hardcopy of said negotiable instrument, (c) a different digital image, and (d) data related to said negotiable instrument.

15. The computer readable medium according to claim 13, further comprising providing at least one of said first digital image and said second digital image by an entity in a form to be displayed by said second institution.

16. The computer readable medium according to claim 13, further comprising synchronizing with a software module located at said second institution.

17. The computer readable medium according to claim 13, further comprising synchronizing on a batch basis said first digital image and said second digital image.

18. The computer readable medium according to claim 13, further comprising providing a verification of receipt of said first digital image by said second institution.

19. A system for displaying digital images of negotiable instruments derived from a plurality of sources, comprising:
   a memory;
   a processor disposed in communication with said memory, and configured to Issue a plurality of processing instructions stored in the memory, wherein the processor issues instructions to:
      retrieve a first digital image of a first negotiable instrument deposited at a first institution;
      receive a deposit of a second digital image of a second negotiable instrument;
      aggregate and store the retrieved first digital image and the received second digital image, wherein said first digital image and said second digital image are synchronized dynamically on digital image by digital image basis; and
      display the stored first and second digital images.

* * * * *